(12) United States Patent
Beasley

(10) Patent No.: US 8,346,070 B2
(45) Date of Patent: Jan. 1, 2013

(54) DEVICE FOR SUPPORTING A CAMERA IN A HELICOPTER

(76) Inventor: Ronald L. Beasley, Port Richey, FL (US)

( * ) Notice: Subject to any disclaimer, the term of this patent is extended or adjusted under 35 U.S.C. 154(b) by 120 days.

(21) Appl. No.: 13/085,591

(22) Filed: Apr. 13, 2011

(65) Prior Publication Data

US 2012/0263445 A1   Oct. 18, 2012

(51) Int. Cl.
   *G03B 39/00*   (2006.01)
   *G03B 17/00*   (2006.01)
   *H04N 5/225*   (2006.01)

(52) U.S. Cl. ............ 396/12; 396/13; 396/421; 396/424; 396/428; 348/373

(58) Field of Classification Search .................... 396/12, 396/7, 13, 52, 55, 428, 419, 421, 424; 348/117, 348/208.99, 373

See application file for complete search history.

(56) References Cited

U.S. PATENT DOCUMENTS

| | | |
|---|---|---|
| 3,485,151 A | 12/1969 | Taylor |
| 5,184,521 A | 2/1993 | Tyler |
| 5,531,403 A | 7/1996 | Tyler |
| 5,710,945 A | 1/1998 | Thompson |
| 5,897,223 A | 4/1999 | Tritchew et al. |
| 6,579,016 B2 | 6/2003 | Chapman |
| 7,303,341 B2 | 12/2007 | Itzkowitz |

OTHER PUBLICATIONS

Three Axis Camera Mount shown on the website of Copterworks which is discussed in paragraph [0050] of applicants' specification, http://www.copterworks.com/Products/ThreeAxisCameraMount/tabid/60/Default.aspx.

*Primary Examiner* — Rochelle-Ann J Blackman
(74) *Attorney, Agent, or Firm* — Lonnie R. Drayer

(57) ABSTRACT

A device for supporting a camera to facilitate capturing stable images from a moving and vibrating platform, such as a helicopter includes a base plate and a vertical post attached to the base plate and extending upwardly from the base plate. A swing arm is fixed to the top of the vertical post in a manner that allows the swing arm to pivot around a vertical axis of the vertical post. A handle is attached to the swing arm and extends upwardly from the swing arm Suspended from the handle below the swing arm is a fixture for supporting the camera. The fixture supporting the camera includes that reduce the transmission of vibrations and shocks to the camera. The device for supporting a camera can be secured in place inside a helicopter without altering the structural integrity of the helicopter.

19 Claims, 21 Drawing Sheets

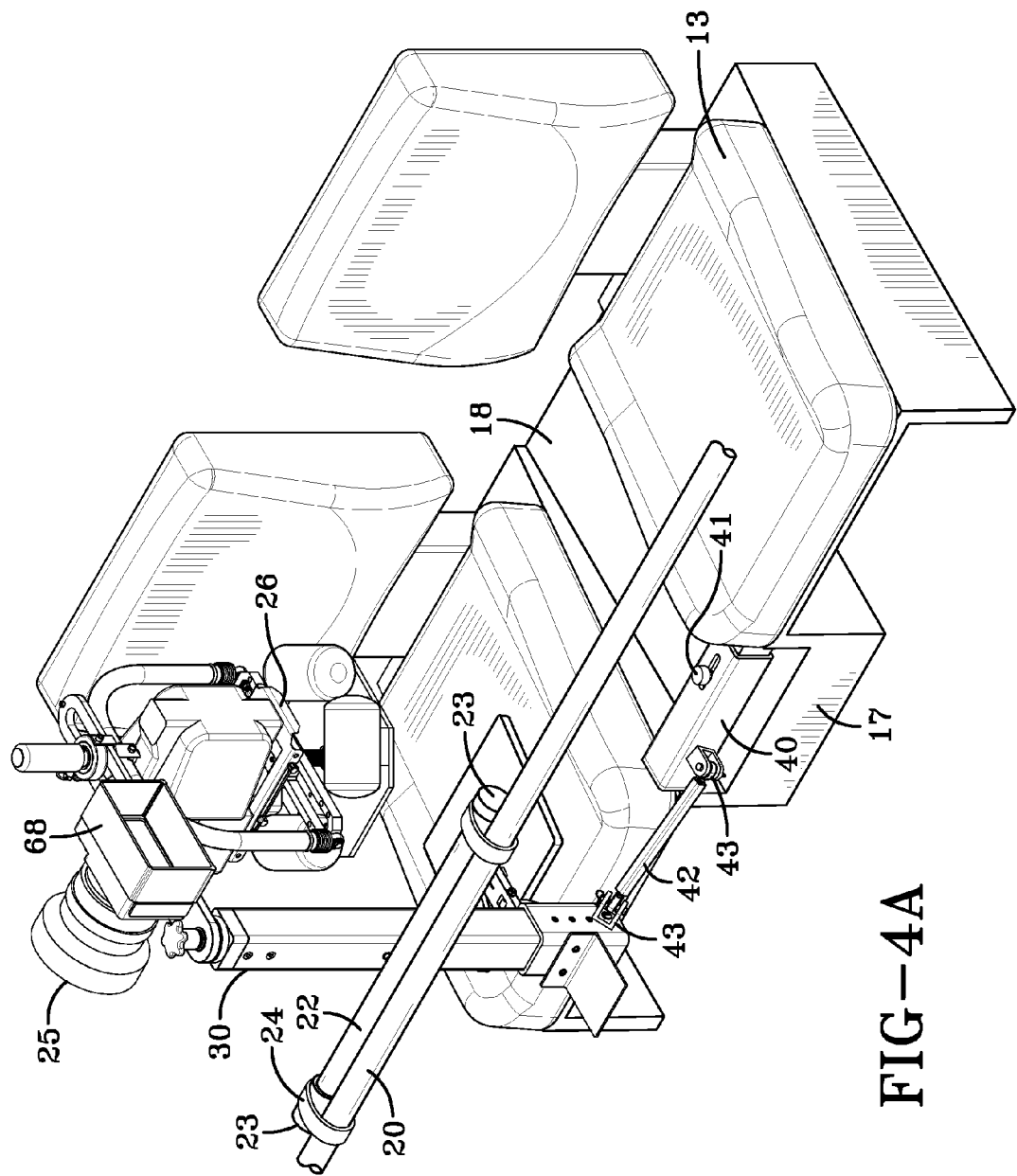

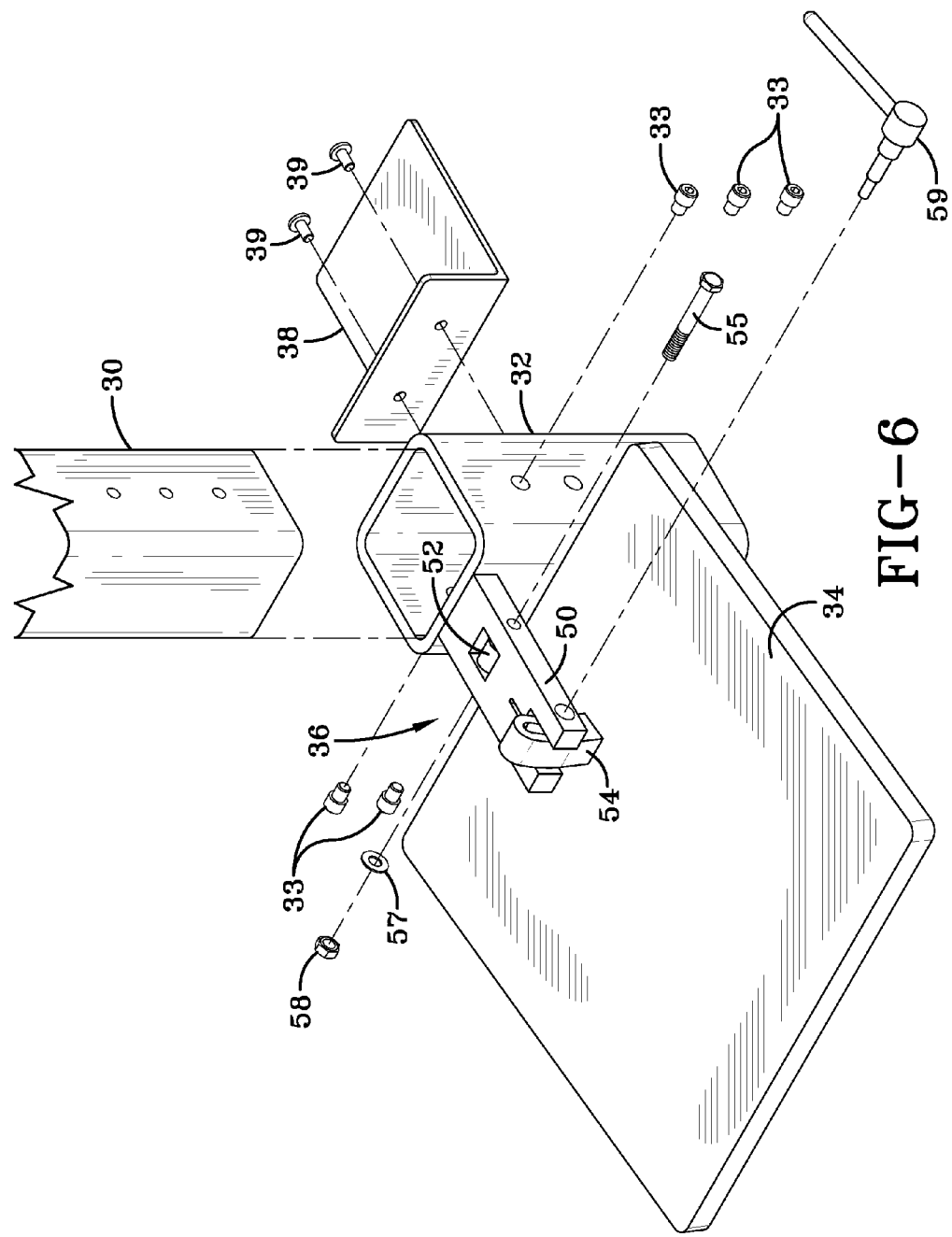

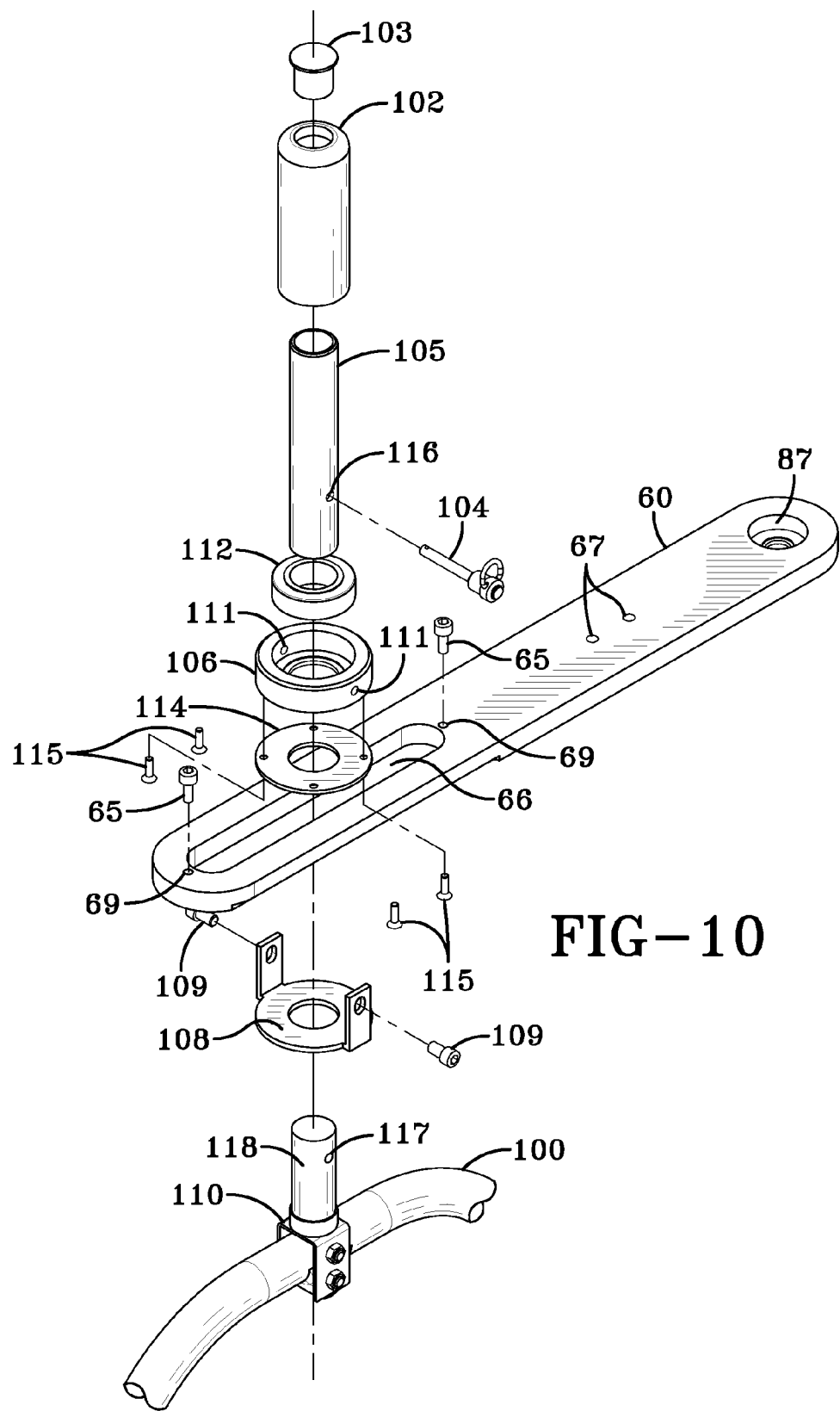

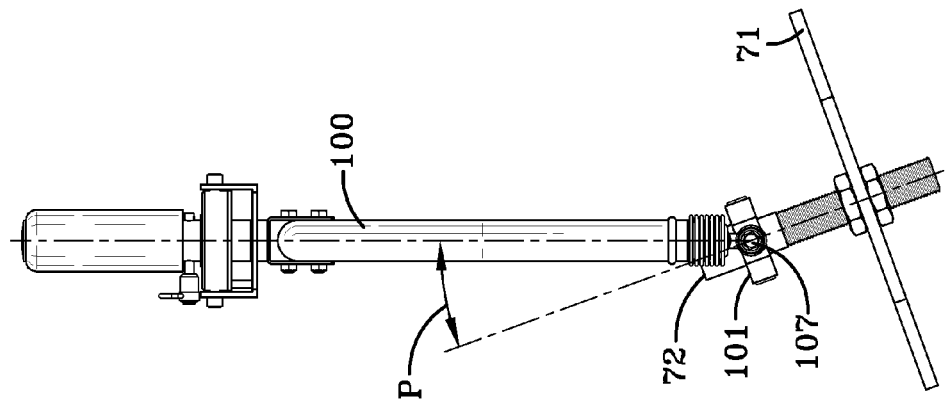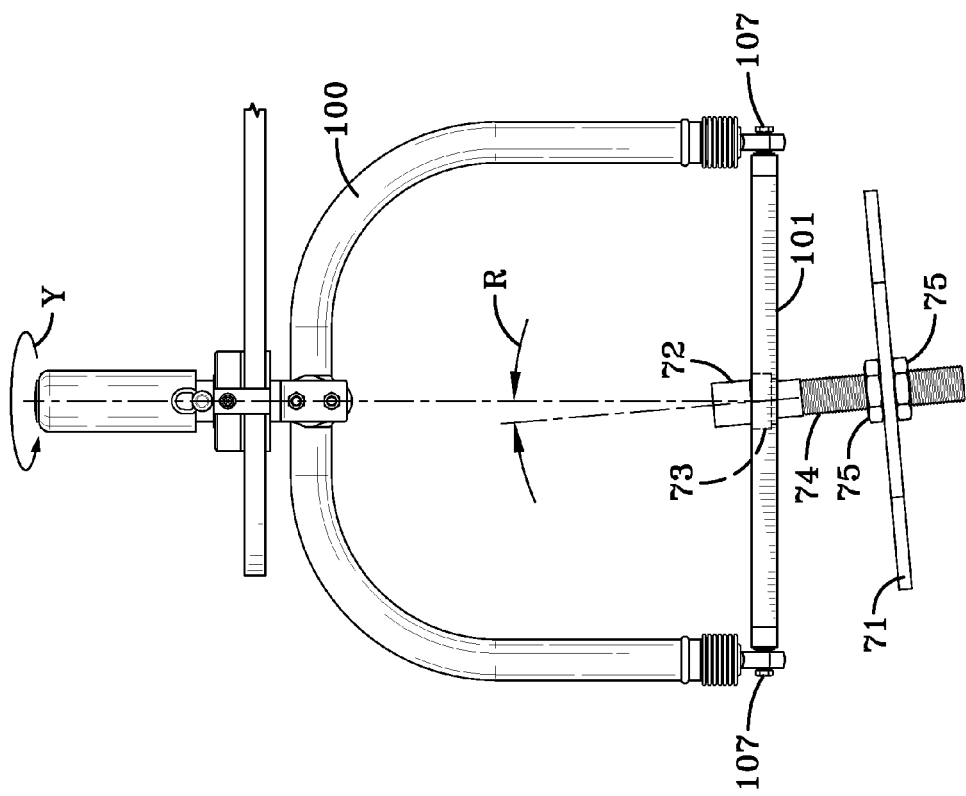

DEVICE FOR SUPPORTING A CAMERA IN A HELICOPTER

FIELD OF INVENTION

The present invention relates to a device for supporting a camera to facilitate capturing stable images from a moving and vibrating platform such as a helicopter.

BACKGROUND OF THE INVENTION

Many modern video and still cameras have built in electronic or optical stabilizers. These stabilizers are helpful when the camera is held relatively still, to capture, for example, a distant landscape. However, when camera movement is made that exceeds the ability of the built in stabilizer to correct, the result is a jumping effect as the stabilizer attempts to reestablish a reference. This problem is seen often when shooting from platforms which may be moving and changing direction and orientation rapidly and/or unpredictably.

The desire to capture good quality photographic images from a flying platform has been around since the flights of early hot air balloons. However a challenge has been the instability of moving and vibrating aerial platforms including helicopters and fixed wing aircraft. While very high quality images can be captured using expensive camera mounting devices, such devices are commonly attached to the exterior of an airplane or helicopter or require significant structural alterations to accommodate location of a camera inside the flying machine. There remains a need for an easily installed device for mounting a camera inside a helicopter without altering any structural components of the helicopter. Such a device can be transported to remote locations where a helicopter is located, installed inside the helicopter, used to capture images and afterwards be removed from the helicopter and transported to another location. The helicopter remains in its original condition. This allows an entity that wishes to capture images from a helicopter on a one time or sporadic basis to do so in an affordable manner without regulatory interference. Such a device is provided by the invention disclosed herein.

DISCUSSION OF THE PRIOR ART

U.S. Pat. No. 6,579,016 B2 teaches a camera crane. In FIGS. 1, 2 and 3A the camera crane includes a track section (60) that includes two parallel square track tubes (162). A frame slider plate assembly (70) is slidable on track bearing rails (164) attached to the inside of each track tube (162). A camera frame (68) is rotatably attached to the frame slider plate assembly (70). The camera frame (68) includes a U-section (270). A base plate (272) is pivotally supported on each of the arms (271) and (273) of the U-section (270). In use, a camera (250), such as a video, television or motion picture film camera (275) is mounted on the base plate (272). FIG. 8 of U.S. Pat. No. 6,579,016 B2 teaches an alternative camera frame embodiment (280). In most applications, the camera frame (68 or 280) will be suspended below the track section (60). However, for added lens height, the camera frame (68 or 280) may be unbolted from the bottom of the track axle, turned upside down, and then bolted on to a riser hub (202), as shown in FIGS. 3B and 8, so that the entire camera frame (68 or 280) is now above the track section (60). U.S. Pat. No. 6,579,016 B2 addresses only possible side to side or left/right low amplitude vibrations of the arms (271 and 273) of the U-section (270). To provide a more stable support for the camera (275), a vibration isolator (400), as shown in FIGS. 10 and 11, may be used with the U-section. The vibration isolator (400) includes a camera mounting plate (402) within a frame (404). The camera mounting plate (402) is moveable only in the side to side (left/right) direction. The camera crane taught in U.S. Pat. No. 6,579,016 B2 is mounted on a camera dolly (20) that has wheel for rolling on a floor or other surface. The camera crane of U.S. Pat. No. 6,579,016 B2 is not intended for use in an environment subject to constant vibration, bouncing and shaking such as a helicopter, fixed wing aircraft, boat, as opposed to the camera mounting device disclosed herein which has features that make it suitable for us in such an environment.

Devices for mounting cameras to the exterior of a helicopter are disclosed for example in: U.S. Pat. No. 3,485,151; U.S. Pat. No. 5,184,521; and U.S. Pat. No. 5,531,403. While such devices may be used to record very good images using still or motion cameras, the placement of such devices on the exterior of a helicopter to some extent affect the aerodynamics of the helicopter. Further the fixation of such devices will require altering the structural integrity of the helicopter, for example by drilling attachment holes. Therefore such devices require approval by the United States Federal Aviation Agency or a comparable government agency in other countries.

U.S. Pat. No. 7,303,341 B2 discloses an apparatus intended to be located inside a moving and vibrating helicopter to facilitate capturing stable images with a still or video camera. A support assembly includes a shaft and ball joint assembly to which an equipment mounting element is mounted for movement about any axis so the device mounted on the plate may tilt in any direction. Gyroscopic stabilizers (gyros) can be mounted to the underside of the plate to stabilize the plate against pitch, roll and yaw. A means is provided to suspended the support assembly in such a way as to permit the support assembly to move relatively freely in any direction with respect to the platform on or in which it is used and to isolate it from vibrations present in such platform. The means to suspend includes a pair of resilient cords attached at one end to each end of the shaft and at their other ends for attachment to a pair of preexisting hooks or other suspension points on the moving platform. When the platform does not have suitable preexisting suspension points the means to suspend the frame may itself include a stand having a base and one or more uprights provided with means to which the resilient cords may be attached, which stand may be positioned in or on the platform. The uprights may be attached directly to the base of the stand but preferably are attached to a turntable rotatably mounted to the base so the entire assembly may be rotated about a vertical axis. The length of the cords is such that the shaft and ball joint are supported at a level in close proximity to the level of the mounting points. This also tends to place the center of mass of the suspended elements close to the level of the mounting points. However in use when located on a seat in a helicopter the device of U.S. Pat. No. 7,303,341 B2 has several shortcomings. First, the only features provided for fixing the apparatus to a helicopter are the base plate (41) having inverted U shaped "tie downs" (42) welded to a base plate (41) as shown in FIG. 2, or eye bolts (43) welded, screwed or bolted into the base plate (41) as shown in FIG. 3. There is no disclosure in U.S. Pat. No. 7,303,341 B2 of how those features are to actually be employed for securing the apparatus in a helicopter. How is this device to be anchored in the helicopter safely? If straps or cords extend through the "tie downs" or eye bolt and then below the seat cushion to cinch the apparatus to the seat cushion the apparatus may tip sideways when the aircraft is banked during flight, or when turbulence is encountered the apparatus may tip either sideways or forward or backward. The high center of mass of the apparatus disclosed in U.S. Pat. No. 7,303,341 B2 may tend to aggravate this stability issue. There is no provision disclosed in U.S. Pat. No. 7,303,341 B2 for moving the camera towards or away from the opening in a side of a helicopter so the viewing angles are limited by the structure of the helicopter. The base plate (41) is intended to sit in a horizontal orientation, but it is common for a seat cushion in a helicopter, or any other conveyance, to be slanted an lower at the rear of the seat than at the front. There is no disclosure in U.S. Pat. No. 7,303,341 B2 of how to accommodate the need for the base plate to be horizontal with a seat base that is inclined from the horizontal.

SUMMARY OF INVENTION

There is provided in accordance with the present invention a device for supporting a camera to facilitate capturing stable images from a moving and vibrating platform. The device for supporting a camera can be secured in place inside a helicopter without altering the structural integrity of the helicopter. The device includes a base plate and a vertical post attached to the base plate and extending upwardly from the base plate. A swing arm is fixed to the top of the vertical post in a manner that allows the swing arm to pivot around a vertical axis of the vertical post. A handle is attached to the swing arm and extends upwardly from the swing arm Suspended from the handle below the swing arm is means for supporting the camera. The means for supporting the camera includes means for reducing the transmission of vibrations and shocks to the camera.

BRIEF DESCRIPTION OF THE DRAWINGS

For a fuller understanding of the invention, reference should be made to the following detailed description, taken in connection with the accompanying drawings.

FIG. 4A is a perspective view from a fourth vantage point of the rear seating area of the helicopter with a device for supporting a camera according to the invention mounted in the rear seating area of the helicopter.

FIG. 6 is an exploded view of a portion of the device which has a base plate for engaging a seat of the helicopter.

FIG. 10 is an exploded view of another part of the upper portion of the device for supporting a camera.

FIGS. 11A and 11B are front and side views of a portion of the device for supporting a camera that is suspended from the upper portion of the device.

DETAILED DESCRIPTION OF THE INVENTION

Figure 1:
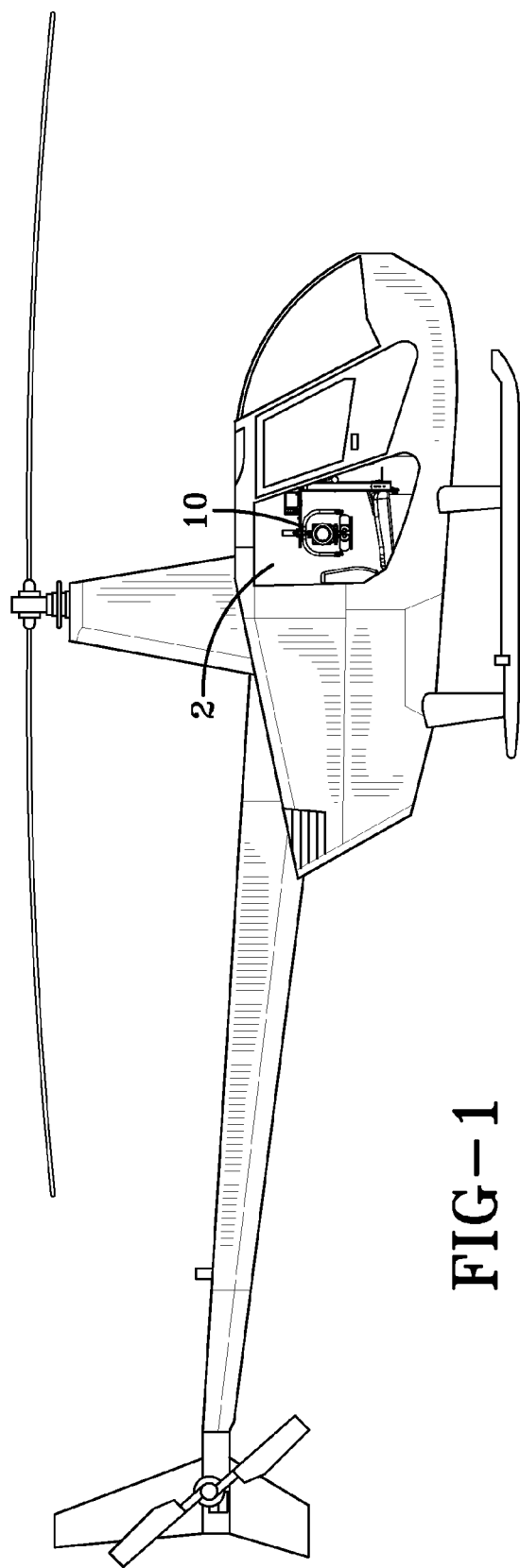
FIG. 1 is a side view of a helicopter that has a rear side door removed and a device for supporting a camera according to the invention is mounted in the helicopter.

FIG. 1 is a side view of a helicopter 1 that has a rear side door removed leaving an opening 2. A device 10 for supporting a camera to facilitate capturing stable images from a moving and vibrating platform according to the invention is mounted in the helicopter. The exemplary helicopter represented in all of the figures is a Robinson R44. The Robinson R44 is a single engine light helicopter produced by the Robinson Helicopter Company based in Torrance, Calif. It has an enclosed cabin with two rows of side-by-side seating for a pilot and three passengers. There are thousands of Robinson R44 helicopters in service around the world that can utilize the device for mounting a camera in a helicopter that is disclosed herein. It is to be understood that the invention disclosed herein has utility with regards to other helicopters and other means of conveyance such as fixed wing aircraft, motor vehicles, and watercraft as well.

As used herein and in the claims terms such as "front", "back", "up", "down". "above", "below" "forward", "rearward" and "sideways" are understood to be used with respect to the interior of a helicopter in which a device according to the present invention is installed in a functioning manner. That is to say for instance that "forward" and "front" indicate directions towards the nose of the helicopter, while "rearward" and "back" indicate directions towards the tail of the helicopter. Terms like "up" and "above" indicate directions towards the top of the helicopter where the rotor blades are located. Terms like "down" and "below" indicate directions towards the bottom of the helicopter where the landing skids and/or wheels are located.

Figure 2:
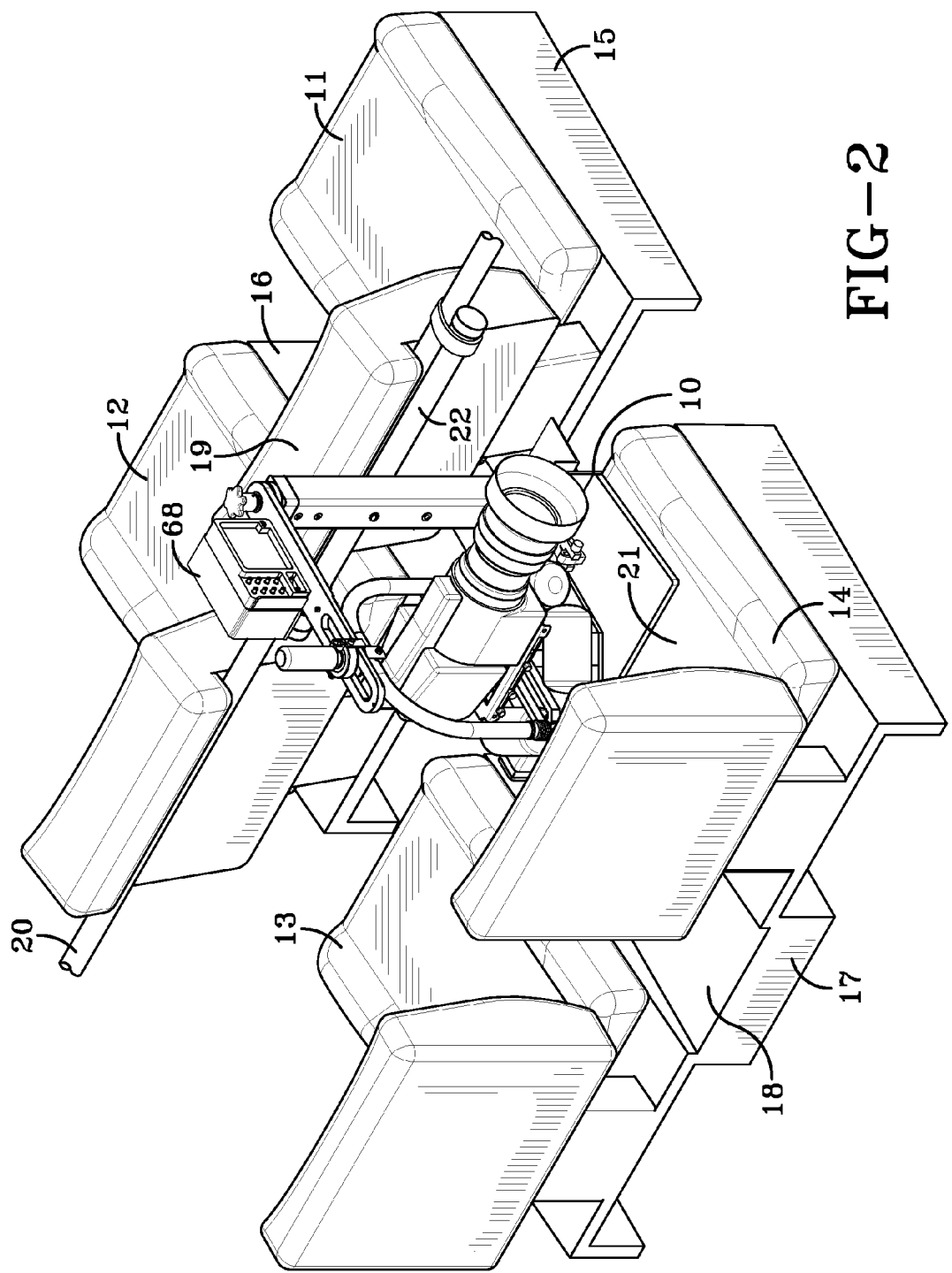
FIG. 2 is a perspective view from a first vantage point of the seats in the helicopter of FIG. 1 with a device for supporting a camera according to the invention mounted in the rear seating area of the helicopter.
Figure 3:
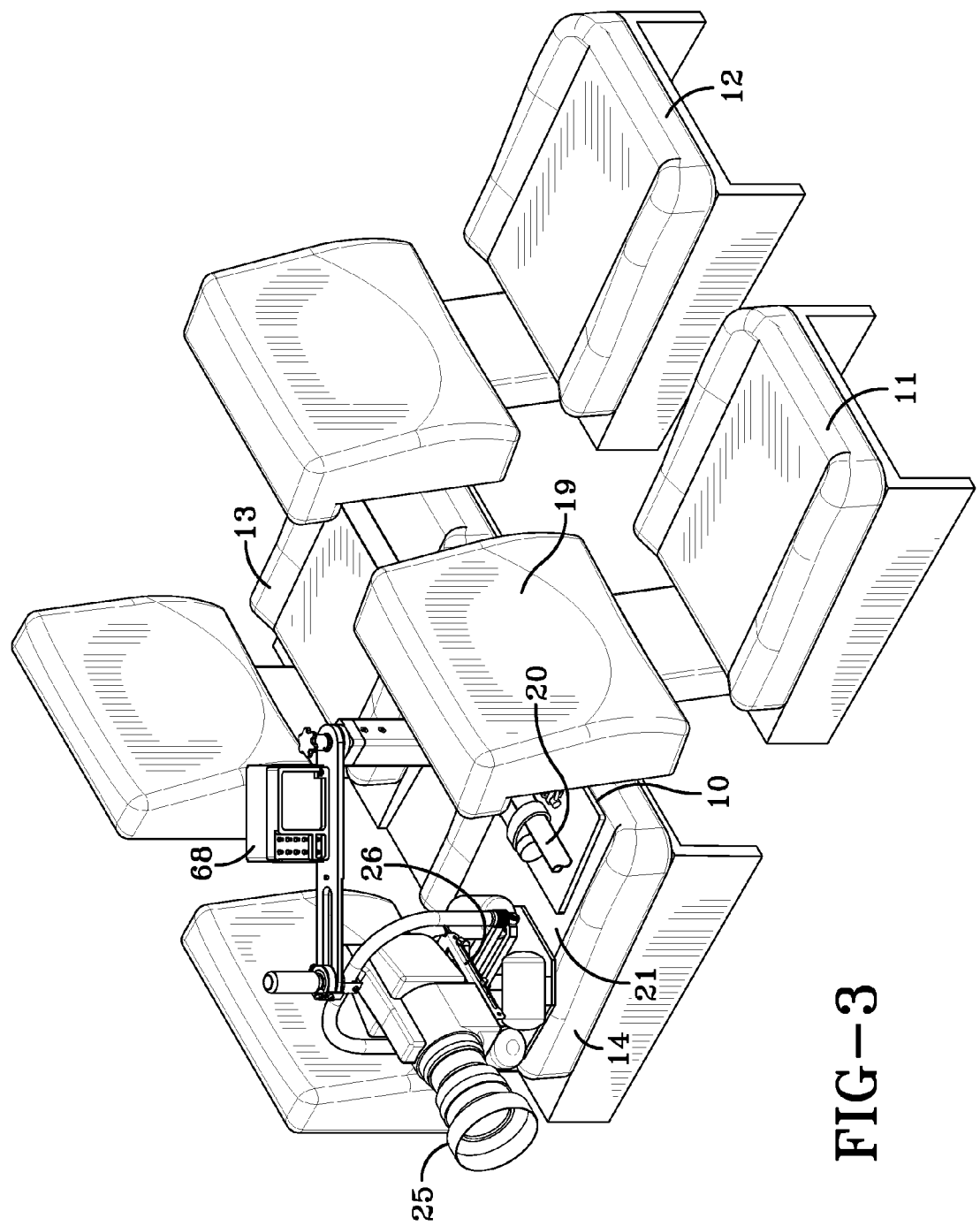
FIG. 3 is another perspective view from a second vantage point of the seats in the helicopter of FIG. 1 with a device for supporting a camera mounted in the rear seating area of the helicopter.
Figure 4:
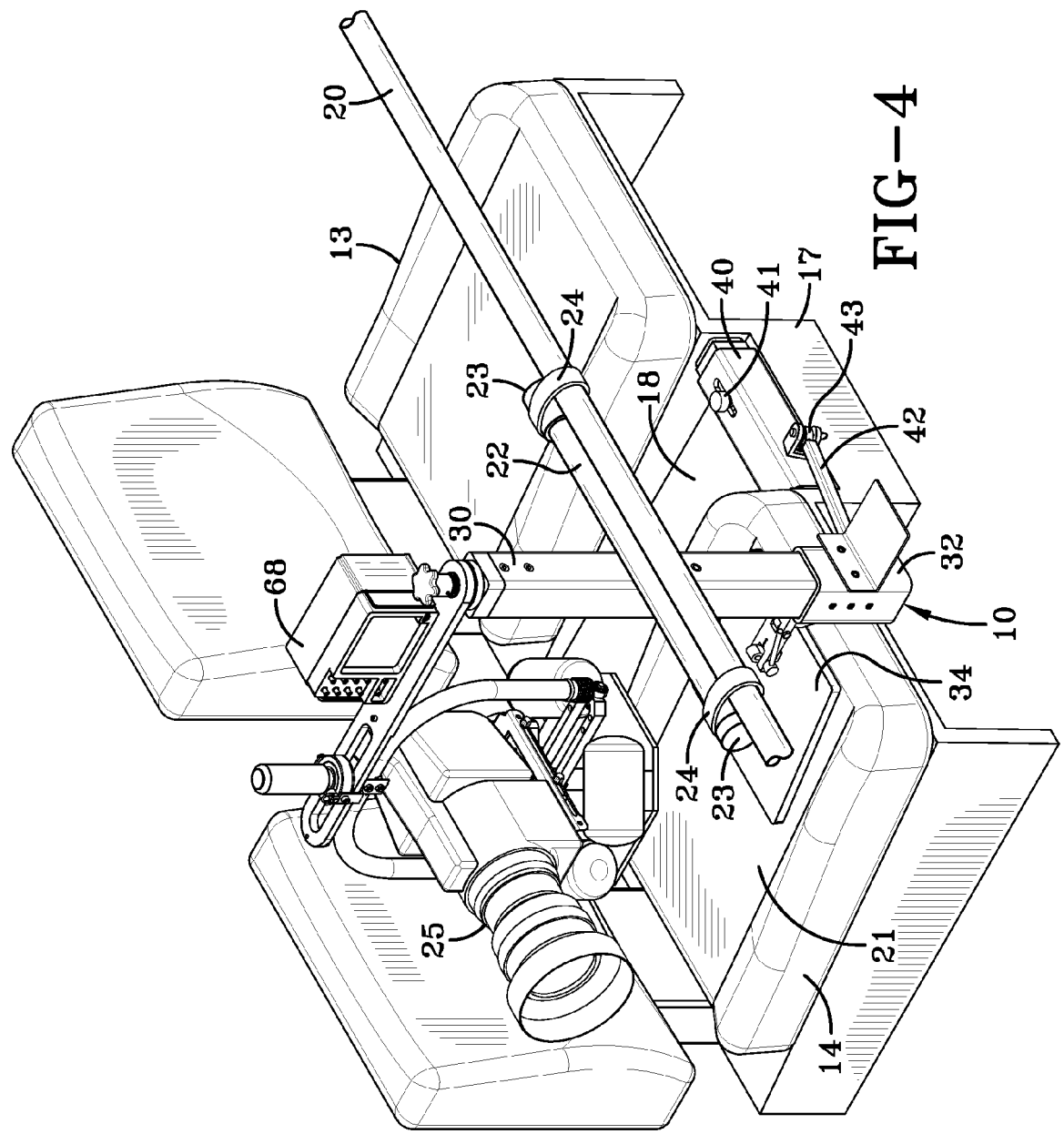
FIG. 4 is a perspective view from a third vantage point of the rear seating area of the helicopter with a device for supporting a camera according to the invention mounted in the rear seating area of the helicopter.

The environment inside of a Robinson R44 helicopter in which a device according to the present invention may be employed is shown in FIGS. 2, 3, 4 and 4A. FIGS. 2 and 3 show all four seats in the helicopter, which FIGS. 4 and 4A show only the rear seats. The right front seat 11 is normally occupied by the pilot of the helicopter, but it may be occupied by a student pilot if the helicopter is being used for a flying lesson. The left front seat 12 is normally occupied by a passenger, co-pilot, student pilot or a pilot instructor. The two rear seats 13, 14 are normally occupied by passengers. Each of the front seats 11, 12 is supported by a raised seat base 15, 16. The two rear seats 13, 14 are supported by a single seat base 17 with a channel 18 in the seat base 17 disposed between the two rear seats. It is understood that all of the seat bases are structural components of the helicopter. A reinforcing bar 20 that is a structural member of the helicopter extends transversely across the helicopter between the pillars located between the front and rear doors of the helicopter behind the front seats and is fixed to the pillars. The reinforcing bar 20 not only adds strength to the helicopter structure, but also serves to provide support to the backs of the two front seats 11, 12. As shown in FIGS. 2, 3, 4 and 4A a device 10 for supporting a camera 25 to facilitate capturing stable images from a moving and vibrating platform such as a helicopter rests on the seat cushion 21 of the right rear passenger seat 14. As used therein and in the claims the term "camera" is understood include any device that records moving or still images in a medium for later viewing, and may or may not record sound, the medium for example being a film, or a an electronic medium such as a tape, disc, memory chip or any other suitable electronic medium.

In the region of the seat back 19 of the right front seat 11 a stabilizing bar 22, having a length that is only slightly greater than the width of the seat back 19 of the pilot's seat 11 is attached to the reinforcing bar 20. As best shown in FIGS. 4 and 4A the stabilizing bar 22 is attached by a suitable means for attachment to a vertical post 30 that is a component of the device 10 for supporting a camera 25. Preferably the vertical post comprises steel, aluminum or another suitable metal. Preferably the stabilizing bar 22 is attached to the vertical post in a detachable manner to facilitate assembly and disassembly of the device 10 for supporting a camera, which makes installation and removal of the device from one helicopter to another, or for transport, more convenient. The stabilizing bar is provided with rubber end caps 23. The rubber end caps create friction with the reinforcing bar to restrict side to side movement of the stabilizing bar with respect to the reinforcing bar. Securing straps 24 are used to attach the stabilizing bar 22 to the reinforcing bar 20. Each of the straps extends around both the stabilizing bar 22 and the reinforcing bar 20. In this manner the device 10 for supporting a camera is fixed to a structural member of the helicopter, namely the reinforcing bar 20 without violating the structural integrity of the helicopter. The stabilizing bar 22 is attached to the reinforcing bar 20 by any suitable means for attachment that does not require altering the shape or strength of the reinforcing bar. In this manner motion of the vertical post 30 and the base plate 34 to which the vertical post is attached are restricted both in directions forward and rearward and side to side with respect to the helicopter.

With reference to FIGS. 4 and 4A a means for further restricting motion of the vertical post 30 and the base plate 34 to which the vertical post is attached are restricted both in directions forward and rearward and side to side with respect to the helicopter can be seen. It is understood that the weight of the device 10 for supporting a camera is supported by the seat upon which the base plate rests. A telescoping anchor member 40 is located in the recessed portion 18 of the base 17 of the rear seats and is secured in place at a length pressed against the vertical sides of the recess 18 by a locking means 41 such as a set screw. The seat base 17 is a structural member of the helicopter, and no violation of the integrity of this structural member, such as drilling a hole therein, is made by wedging the anchoring member 40 in place in this manner. Brackets 43, 43 are fixed to the sleeve 32, that receives the vertical post 30, and to the telescoping anchor member 40. A strut 42 extends between the two brackets 43, 43 and is fastened to each of the brackets. Preferably the strut is attached to each bracket by a pin that can be removed to facilitate the installation, removal and transport of the device 10 for supporting a camera according to the invention. That is to say as the camera is moved towards the opening in the side of the helicopter all, or almost all force placed on the vertical post is transferred through the post and strut to the telescoping anchor member 40 and the seat base 17.

Figure 5:
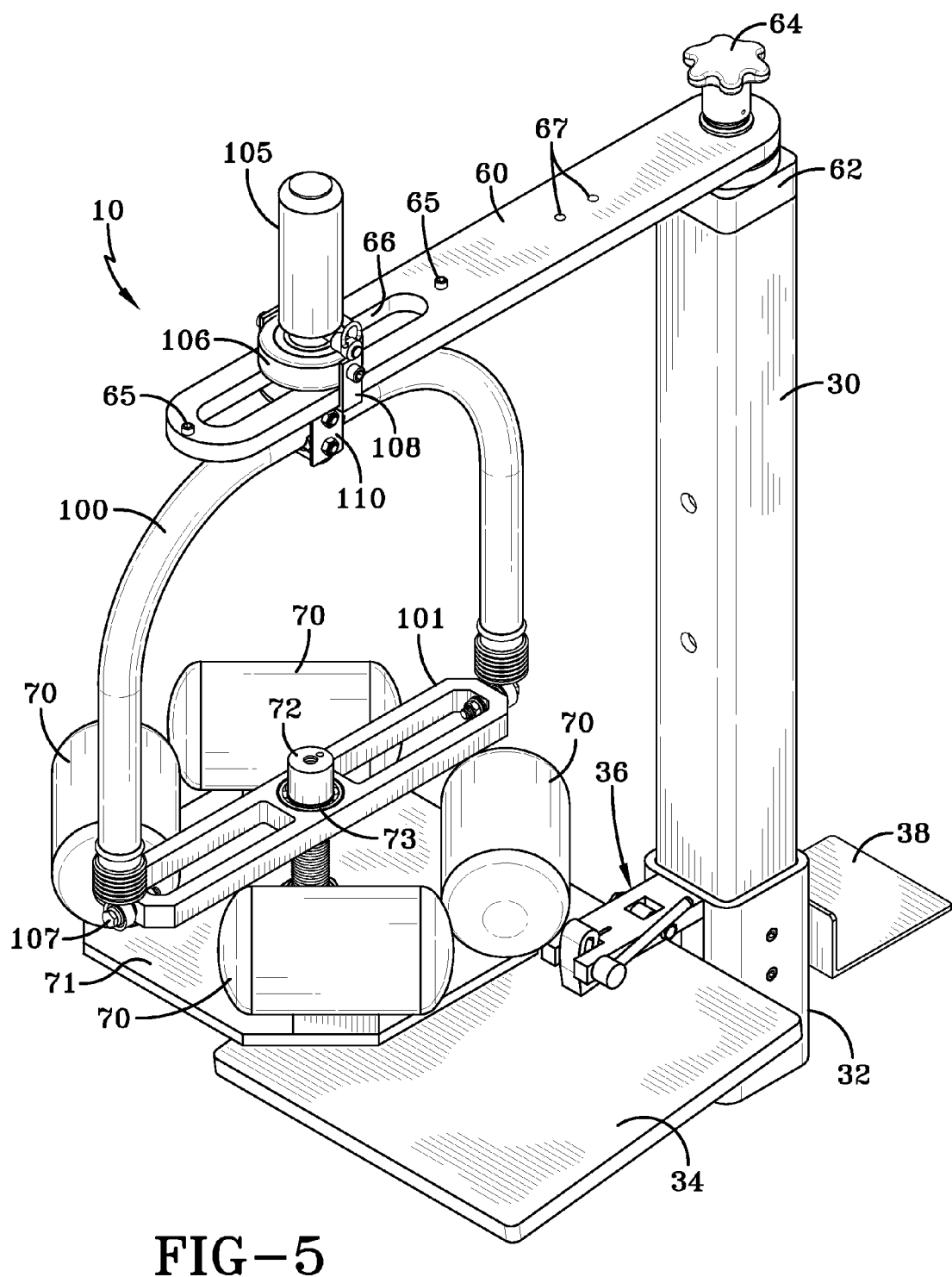
FIG. 5 is a perspective view of the device for supporting a camera according to the invention wherein the camera and the member for attaching the camera to the device are not shown.

Referring now to FIGS. 5 and 6 in conjunction with FIGS. 2, 3, 4 and 4A, a single vertical post 30 is fixed to the base plate 34 via a sleeve 32 that receives the vertical post 30 therein, such that the single vertical post extends upwardly from the base plate. In the present invention only one vertical post is employed as opposed to the need for two vertical posts in the device disclosed in U.S. Pat. No. 7,303,341 B2. While the vertical post and the sleeve are shown as comprising rectangular, preferably square tubing, it is understood that they may comprise tubing of any suitable shape and that the vertical post may even be solid, so long as the exterior of the vertical post is complementary to the interior surface(s) of the sleeve that receives the post. Preferably the sleeve comprises steel, aluminum or another suitable metal. As shown in FIG. 6 the vertical post 30 may be inserted into and removed from the interior of the sleeve 32, and the vertical post may be secured to the sleeve using a plurality of fasteners 33 that extend through aligned passages in the sleeve and vertical post. Preferably the fasteners 33 are threaded and mate with threads in the passages in at least the vertical post 30. It is understood that the vertical post and the sleeve could be made as a single part, but it is preferred that they be separate parts as shown to facilitate installation and removal of the device from one helicopter to another, or for transport.

A platform 38 for accessories, such as a power supply for gyros, may be attached to the collar 32 using fasteners 39. Preferably the fasteners 39 are threaded and mate with threads in passages in the vertical sleeve 32.

Figure 7:
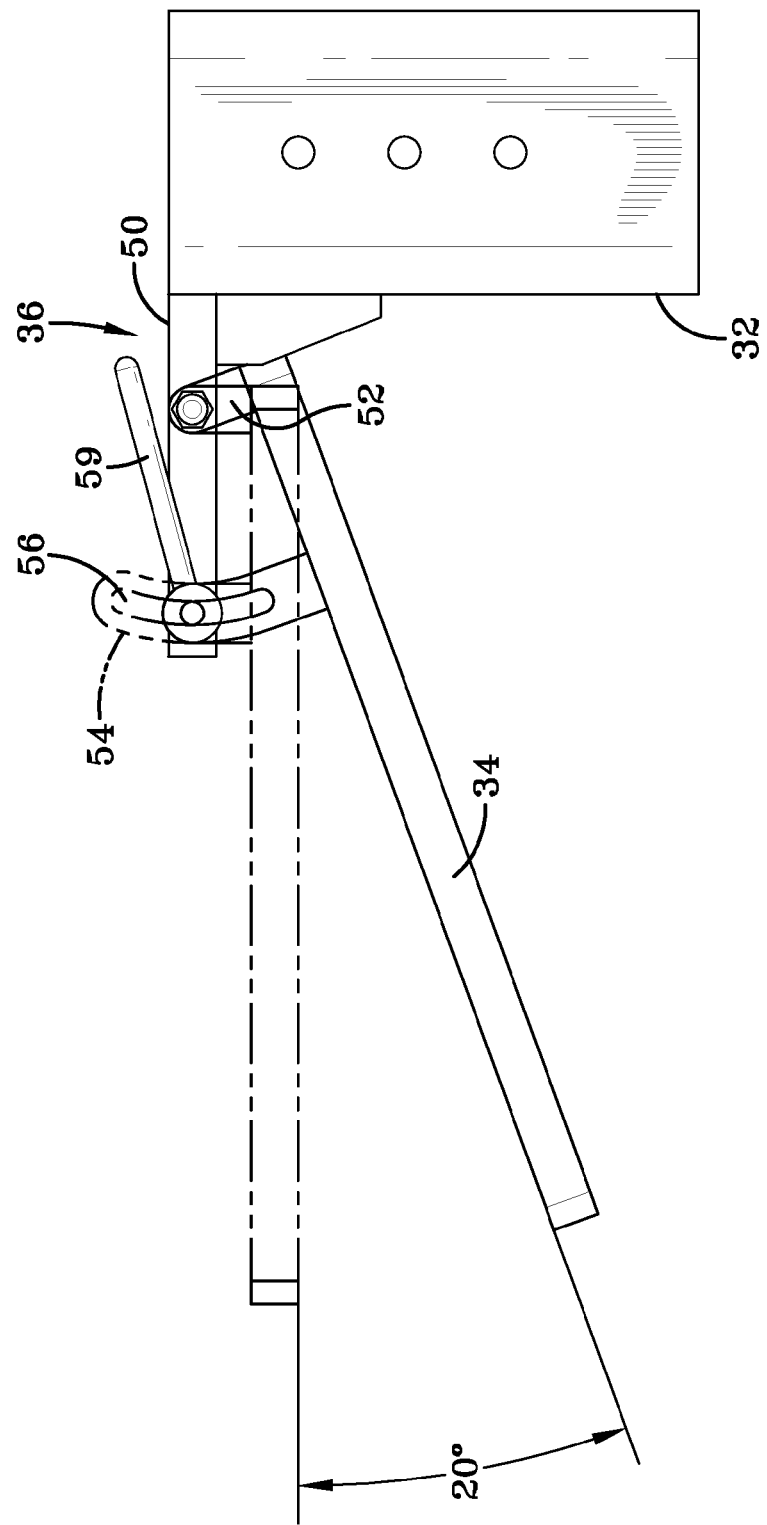
FIG. 7 is a side view showing the way in which the base plate may be adjusted to conform to a seat of the helicopter.

A base plate 34, best shown in FIGS. 5, 6 and 7, is attached to the sleeve 32. Preferably the base plate comprises steel, aluminum or another suitable metal. When the device is installed in a helicopter the base plate rests on a seat cushion 21 of one of the passenger seats 13, 14. In FIGS. 2, 3, 4 and 4A the base plate is shown resting upon the seat cushion 21 of the right rear passenger seat 13, but it is understood that the device could be mounted using the left rear passenger seat 13. A mounting bracket 50 extends from the sleeve 32 and is substantially perpendicular to the sleeve. Preferably the mounting bracket comprises steel, aluminum or another suitable metal and is fixed to the sleeve in a permanent manner such as by welding. A projection 52 extends from an upper surface of the base plate 34 in a perpendicular orientation and a portion of the projection 52 is disposed is a slot in the mounting bracket 50. A bolt 55 extends through aligned holes in the mounting bracket 50 and projection 52 to form a means 36 for attaching the base plate 34 to the sleeve 32 that functions as a pivotable hinge. An arcuate projection 54 having an arcuate slot therein extends through a notch at an end of the mounting bracket 50 that is distal from the sleeve 32. A member 59 for securing the angular orientation of the base plate 34 extends through passages in the mounting bracket 50 and an arcuate slot 56 in a projection 54 and is secured to a washer 57 and nut 58. In this way the base plate is fixed to the vertical post by a mechanism that is adjustable to vary the inclination of the base plate with respect to the vertical post. The adjustability of the orientation of the base plate with respect to the sleeve facilitates orienting the post 30 in a manner that is as close as possible to vertical in various helicopters. It is understood that if a device according to the present invention is manufactured for use in only one model of helicopter, such as the Robinson R44, the base plate may be attached to the sleeve in a non-adjustable manner at the proper orientation to conform to the seat cushions of that helicopter wherein the base plate is fixed to the vertical post inclined at an angle extending below horizontal with respect to the vertical post. Put another way, the base plate is inclined with respect to the vertical post in a manner that allows the entire base plate to rest against a seat cushion of a rear seat of the helicopter when the single vertical post is oriented vertically.

Figure 8:
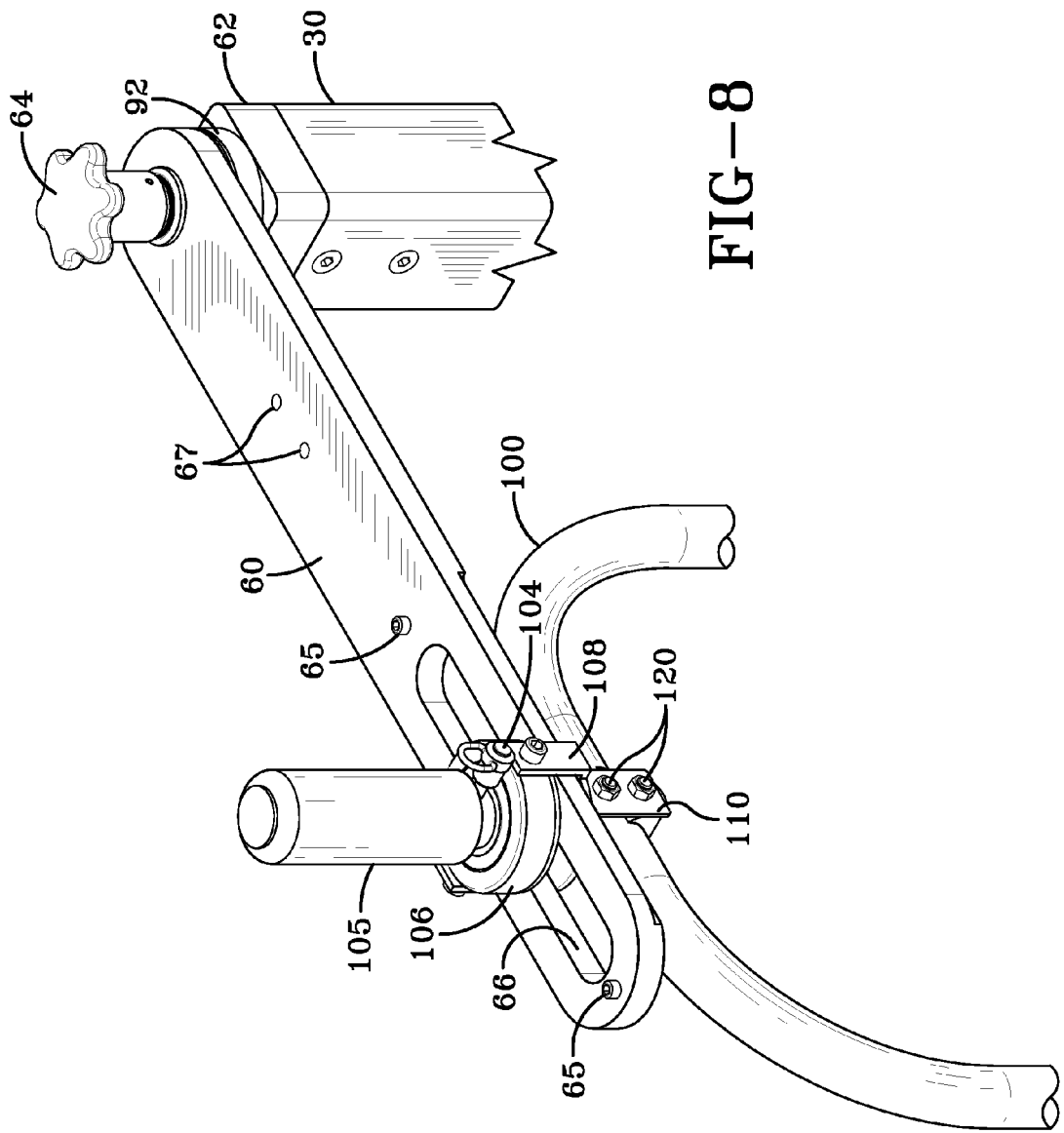
FIG. 8 is shows an upper portion of the device for supporting a camera.
Figure 9:
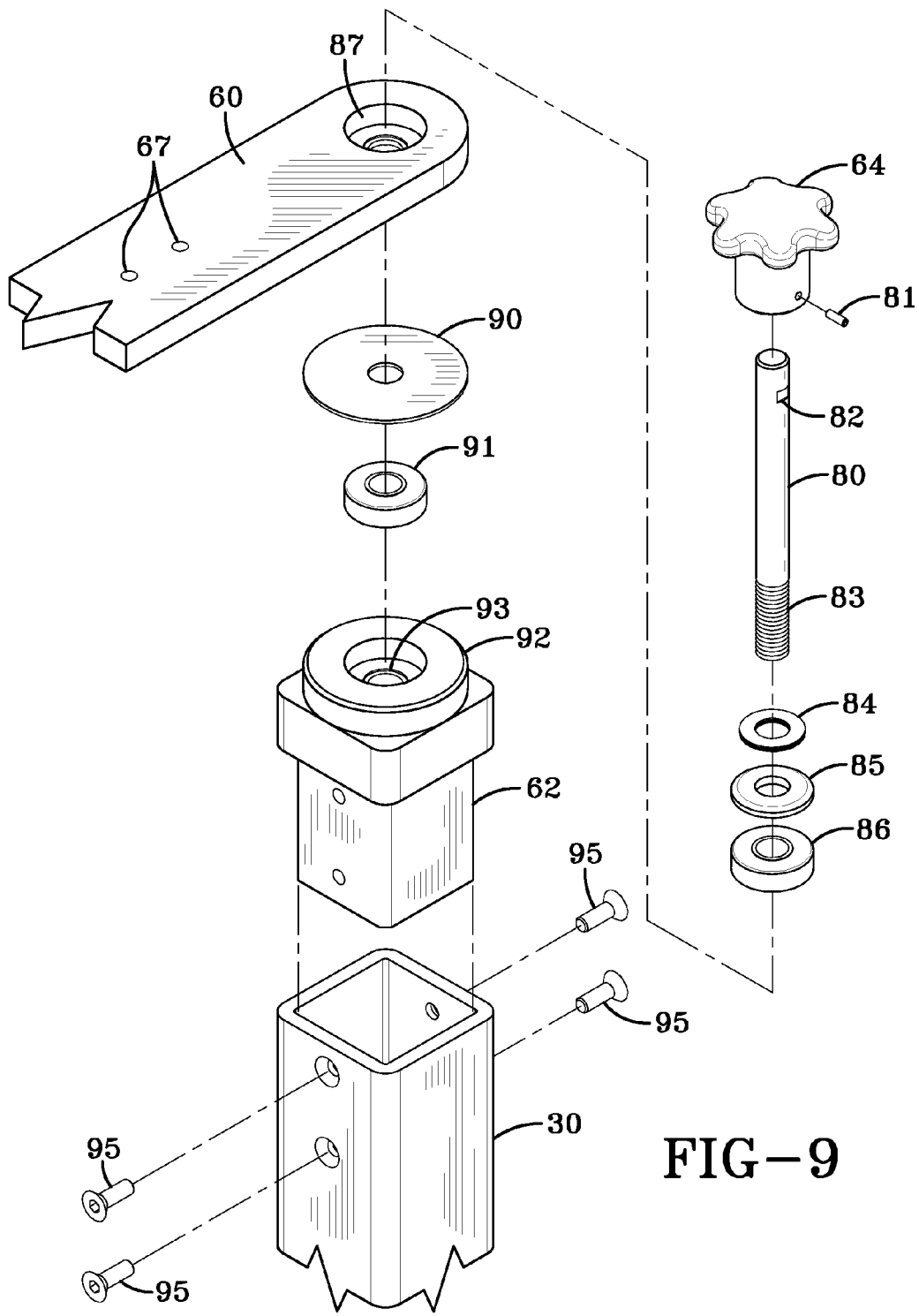
FIG. 9 is an exploded view of part of the upper portion of the device for supporting a camera.

Referring now to FIGS. 5, 8 and 9 in conjunction with FIGS. 2, 3, 4 and 4A, a swing arm 60 is oriented horizontally and is fixed to the top of the vertical post 30 in a manner that allows the swing arm to pivot around a vertical axis of the vertical post. An end cap 62 is located at an upper end of the vertical post 30.

Preferably the end cap comprises steel, aluminum or another suitable metal. As shown in FIG. 9 the end cap 62 may be inserted into and removed from the interior of the vertical post 30, and the vertical post may be secured to the sleeve using a plurality of fasteners 95 that extend through aligned passages in the vertical post and end cap. Preferably the fasteners 95 are threaded and mate with threads in the passages in at least the end cap 62. It is understood that the vertical post and the end cap could be made as a single part, but it is preferred that they be separate parts as shown to facilitate manufacture of the device. A collar 92 is located at the top of the end cap 62. A hollow tubular member 93 extends downward into the end cap 62 from a circular depression defined by the collar 92. A lower portion of the interior surface of the hollow tubular member is threaded. A knob 64 is fixed to a stud 80 using a pin 81 that engages a flat 82 on the stud. A portion of the stud distal from the knob is provided with exterior threads 83. A Teflon® washer 90 is located between the upper surface of the collar 92 and a lower surface of the swing arm 60. A wafer bearing 91 is located in the depression defined by the collar 92 and is overlaid by the Teflon® washer 90. Washers and bearings 84, 85, 86 are located in or directly above a depression 87 that is located in an upper surface of the swing arm 60 near an end of the swing arm. The stud 80 with the knob 64 attached thereto extends through passages in: the washers and bearings 84, 85, 86; the swing arm 60; the Teflon® washer 90; the wafer bearing 91; and into the hollow tubular member 93 where the exterior threads 83 of the stud mate with the threads on the interior of the hollow tubular member 93. It is understood that any suitable combination of washers and bearings, or even just washers or just bearings may be used so long as a desired amount of friction between the swing arm and the vertical post is obtained. This assembly for fastening the swing arm 60 to the top of the vertical pillar assembly provides some damping of vibrations and yaw between the swing arm and the vertical pillar assembly and provides smooth low friction pivoting of the swing arm. The knob 64 may be turned to bring compression upon the assembly of the swing arm to the vertical post to restrict movement of the swing arm with respect to a vertical axis of the vertical post.

Referring now to FIGS. 5, 8 and 10 in conjunction with FIGS. 2, 3, 4 and 4A, the swing arm 60 is in the form of a bar that preferably comprises steel, aluminum or another suitable metal. The depression 87 referred to above is located in an upper surface of the swing arm near an end of the swing arm. Threaded holes 67 are used for mounting a monitor 68 to the top side of the swing arm 60. A side of the monitor provided with connections for receiving conductors from a camera 25 is visible in FIGS. 2, 3 and 4. A side of the monitor at which an inset screen may be used for viewing what is being recorded by the camera 25 is visible in FIG. 4A. For clarity wires for conducting power and signals is not shown in any of the figures, but it is understood that such wires are employed for instance between the monitor 68 and the camera, between a power source and the monitor, between a power source and the gyros 70 of FIG. 5A, and if needed between a power source and the camera itself. It is understood that the power source may be a storage battery or the electrical system of the helicopter. Of course one or more appropriate current controlling devices may be employed in accordance with good engineering practices.

A slot 66 in the swing arm 60 with two closed ends extends longitudinally with respect to the swing arm. A handle 105 is attached to the swing arm and extends upwardly from the swing arm for use by an operator of the device to move the camera 25, which is suspended below the swing arm, longitudinally with respect to the swing arm and to rotate the camera about a longitudinal axis of the handle. Stops 65 attached to the swing arm using holes 69 in a top surface of the swing arm limit the movement of the handle 105 in the slot. The handle 105 preferably comprises a metal tube with a hollow lumen. The handle passes through a roller bearing 112 that is seated in a well in a retainer ring 106. A Teflon® washer 114 is fixed to a lower surface of the retainer ring 106 using threaded fasteners 115 that pass through holes in the washer into threaded holes in the lower surface of the retainer ring. When the handle is assembled with the swing arm 60 the roller bearing 112, retainer ring 106, and Teflon® washer 114 are located above the swing arm 60.

An inverted U shaped hanger 100 is located below the swing arm 60. A post 118 is fixed to the inverted U shaped hanger by a means for attachment 110. A slider retainer 108 that has a circular washer portion with opposed ears that extend from the circular washer portion. The post 118 extends through: a passage in the circular washer portion of the slider retainer 108; the slot 66 in the swing arm 60; and into the lumen of the hollow handle 105. While the circular washer portion of the slider retainer 108 is located below the swing arm 60, the opposed ears that extend from the circular washer portion are located on opposing lateral sides of the swing arm and are fixed to the retainer ring 106 using threaded fasteners 109 that pass through holes in the opposed ears into threaded holes 111 in the retainer ring 106. The post 118 located in the lumen of the handle 105 is secured in place using a retaining pin 104 that extends through passages 116 in the handle and 117 in the post. For the comfort of an operator of the device a cushioning grip 102 is slid onto the handle 105 and an end cap 103 plugs an upper end of the lumen of the handle. Thus the handle and the attached inverted U shaped hanger may be moved in the slot in the swing arm with the Teflon® washer allowing the assembly of the handle and hanger to move smoothly and minimize the generation of forces that could be passed to the camera causing instability of the camera. It is preferable that the inverted U shaped hanger and components fixed thereto can be separated from the handle and swing arm by removing the retaining pin 104 to facilitate installation and transport of the camera mounting device.

Figure 12A:
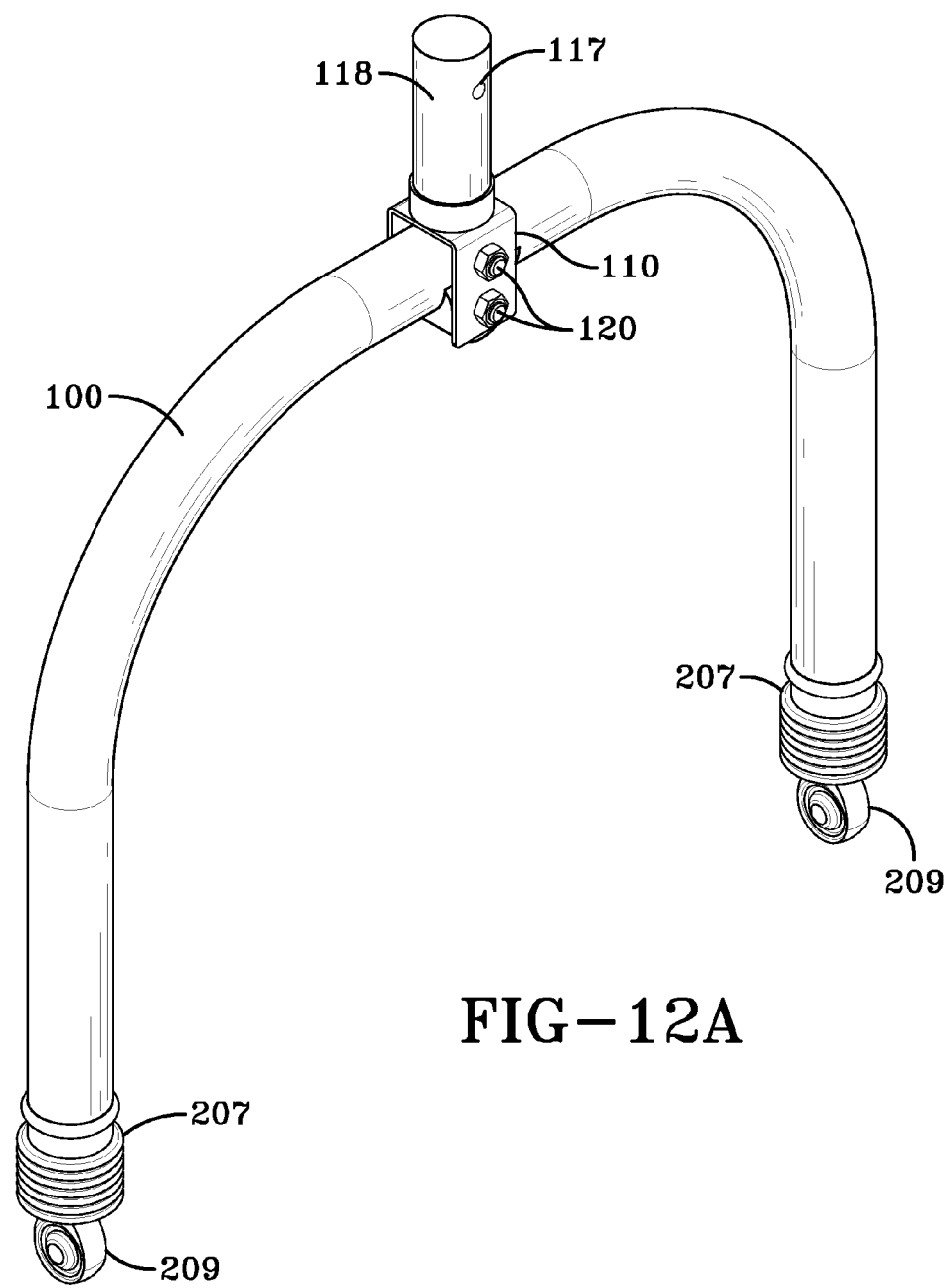
FIG. 12A is a perspective view of an inverted U shaped hanger that is suspended from the upper portion of the device.
Figure 12B:
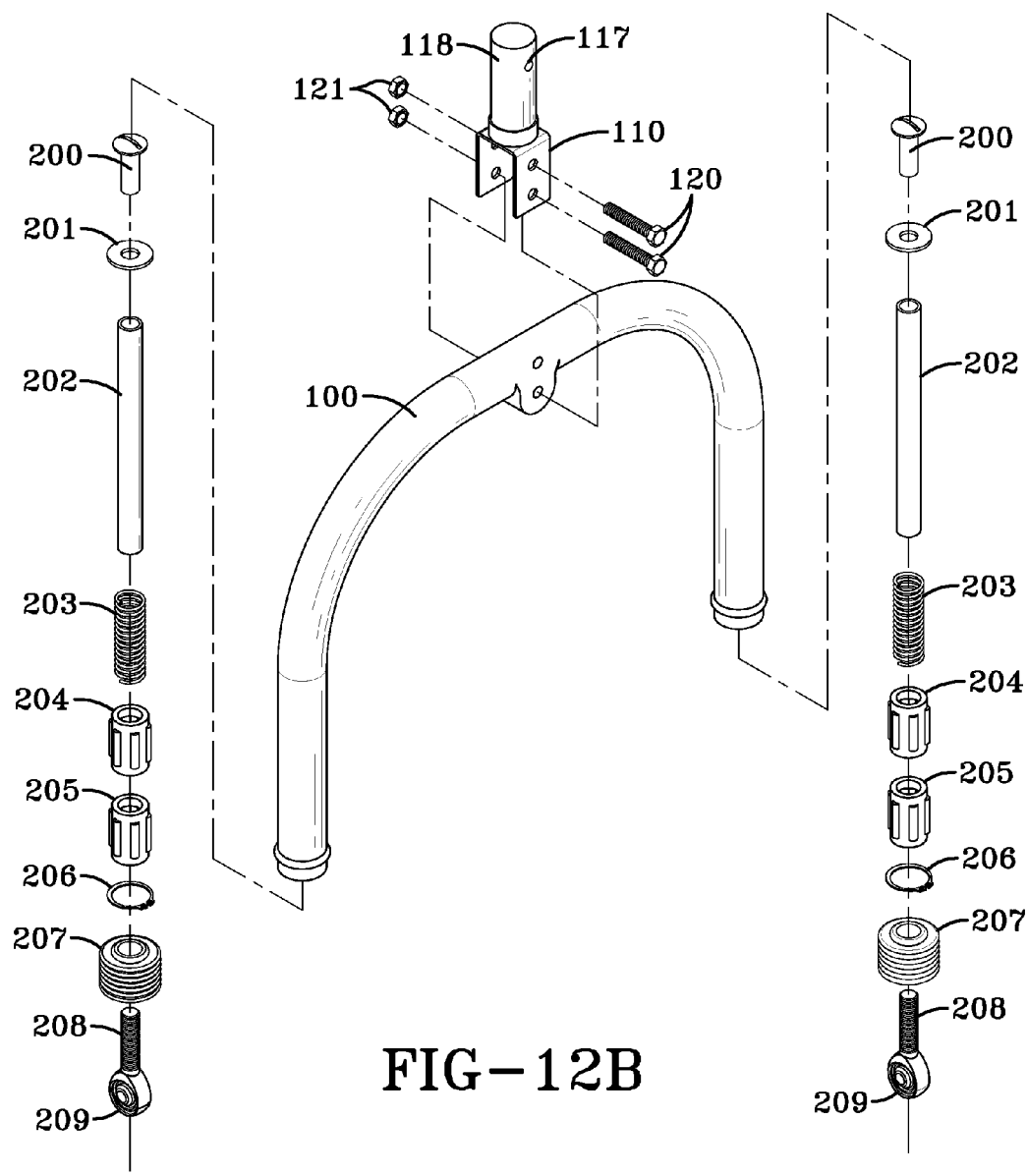
FIG. 12B is an exploded view of the inverted U shaped hanger.
Figure 12C:
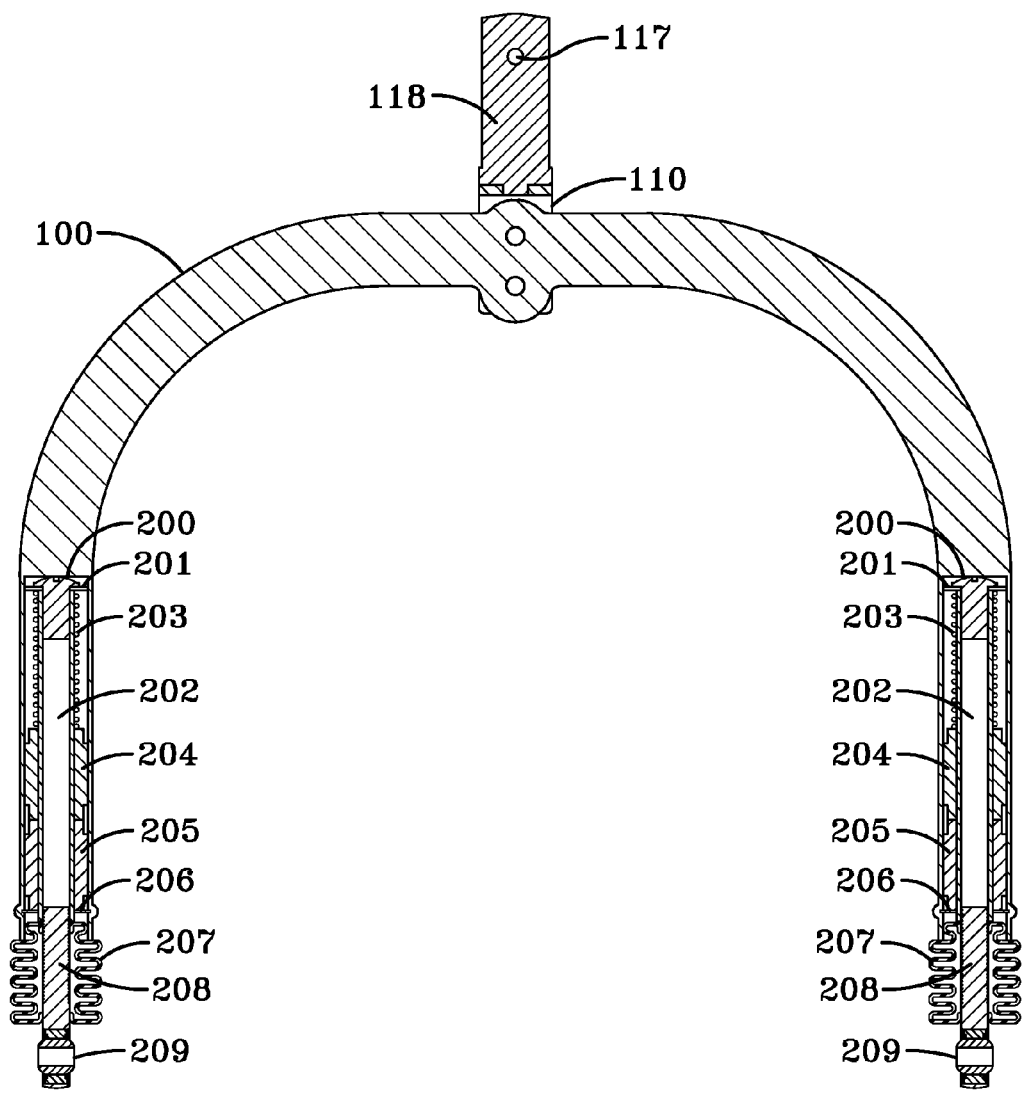
FIG. 12C is a cross section view of the inverted U shaped hanger.

The construction of the inverted U shaped hanger 100 is best shown in FIGS. 12A, 12B and 12C. FIG. 12A is a perspective view of an inverted U shaped hanger. FIG. 12B is an exploded view of the inverted U shaped hanger. FIG. 12C is a cross section view of the inverted U shaped hanger. The means 110 for fixing the inverted U shaped hanger is to the post 118 described above is a bracket having threaded fasteners 120 that extend through aligned holes in the bracket and through the hanger to be secured in place by nuts 121. It is preferable that the hanger 100 be fixed to the post 118 in a manner that does not allow the hanger to pivot with respect to the means for attachment 110, but if desired the hanger may be fixed to the post in a pivotable manner. However, the hanger can be moved laterally with respect to the slot in the swing arm, and may be rotated about a longitudinal axis of the handle 105.

At least a portion of each of the legs of the inverted U shaped hanger 100 is hollow. It is understood that the entire length of the inverted U shaped hanger may be hollow. Preferably the inverted U shaped hanger comprises steel, aluminum or another suitable metal. A hollow portion of each leg of the inverted U shaped hanger is provided with a means for damping the transmission to a camera of shocks and vibrations that are encountered during the operation of a helicopter or other conveyance. A solid rod 202 is drilled and tapped at each end of the rod. A washer 201 is secured to at top end of the rod by a screw 200. The washer has an outside diameter that is large enough to retain other components of the damping mechanism on the rod. The rod is inserted in a coil spring 203 with the spring adjacent the washer 201. The rod then extends through at least one linear bearing 204, 205. The linear bearing(s) are press fit inside the leg of the inverted U shaped hanger. The rod moves inside the linear bearing(s) up and down against the coil spring 203 in response to shock and vibration encountered during the operation of the helicopter or other conveyance. A snap ring 206 prevents the downward motion of the linear bearings and retains the damping device inside the leg by being disposed in a circumferentially extending channel in the leg. It is understood that the damping device may be retained by any other suitable means. A bellows type dust cover 207 is secured in place at a lower end of the leg of the of the U shaped hanger A rod end retaining eye bolt 208 is threaded into the lower end of the rod 202. A bellows type dust cover 207 is held in place elastically, possibly using ties as well. The eye portion of the eye bolt has a passage 209 that will be used for fixing additional components to the camera mounting device.

Figure 11D:
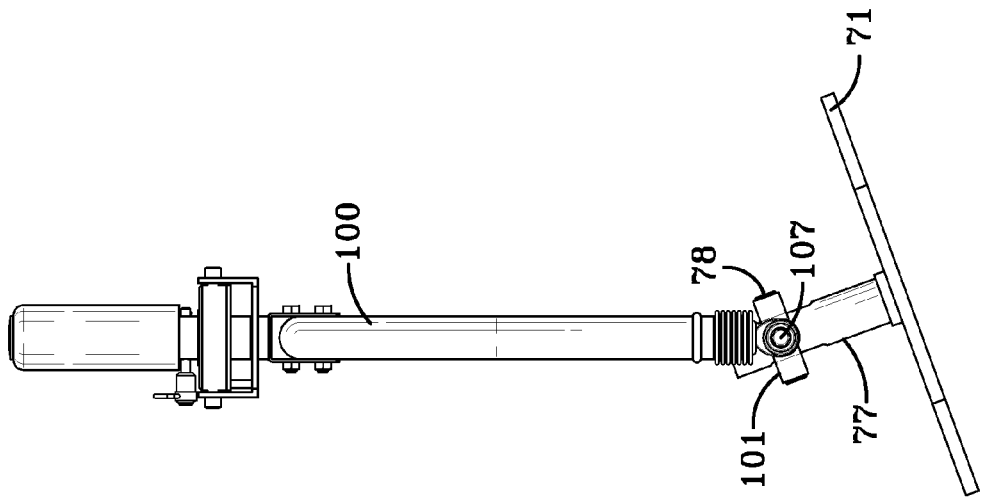
FIGS. 11C and 11D are front and side views of an alternative embodiment of a portion of the device for supporting a camera that is suspended from the upper portion of the device.
Figure 11C:
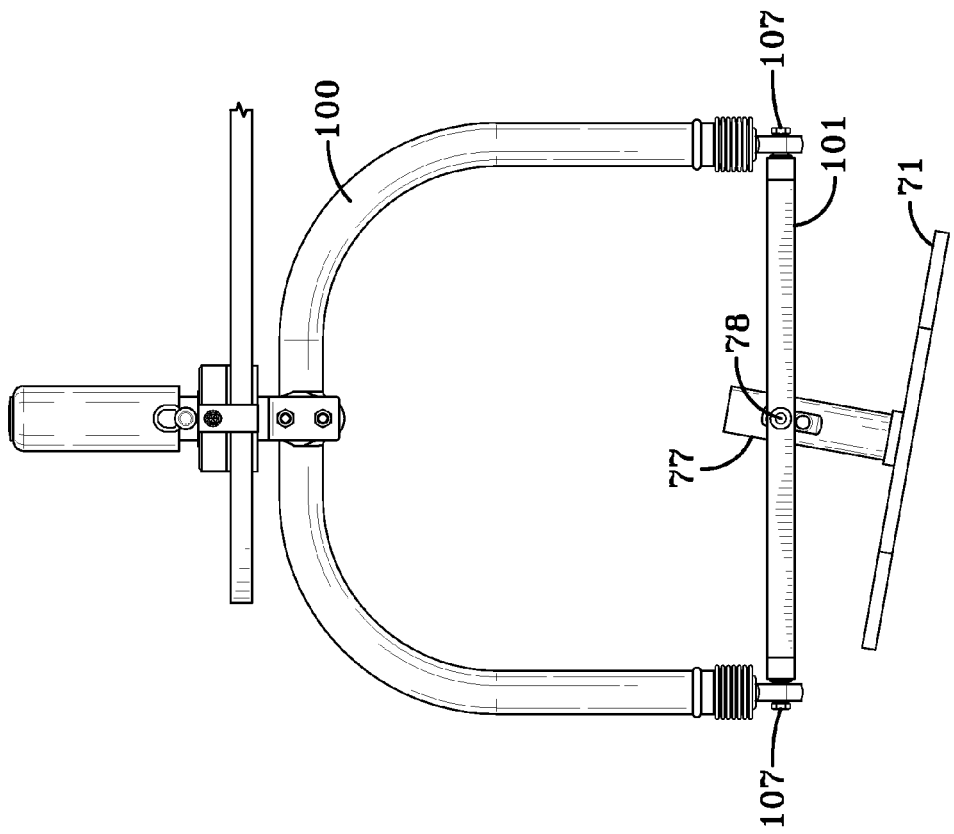

FIG. 5 is a perspective view of the device 10 for supporting a camera according to the invention wherein the camera and the member for attaching the camera to the device are not shown. As best seen in FIGS. 5, 11A, and 11C a crossbar 101 extends between the rod end retaining eye bolts 208 at the lower ends of the legs of the inverted U shaped hanger 100. Each end of the crossbar 101 is fixed to one of the rod end retaining eye bolts using a suitable fastener 107 that allows the crossbar to pivot with respect to the lower end of the inverted U shaped hanger. Preferably the crossbar comprises steel, aluminum or another suitable metal.

Figure 5A:
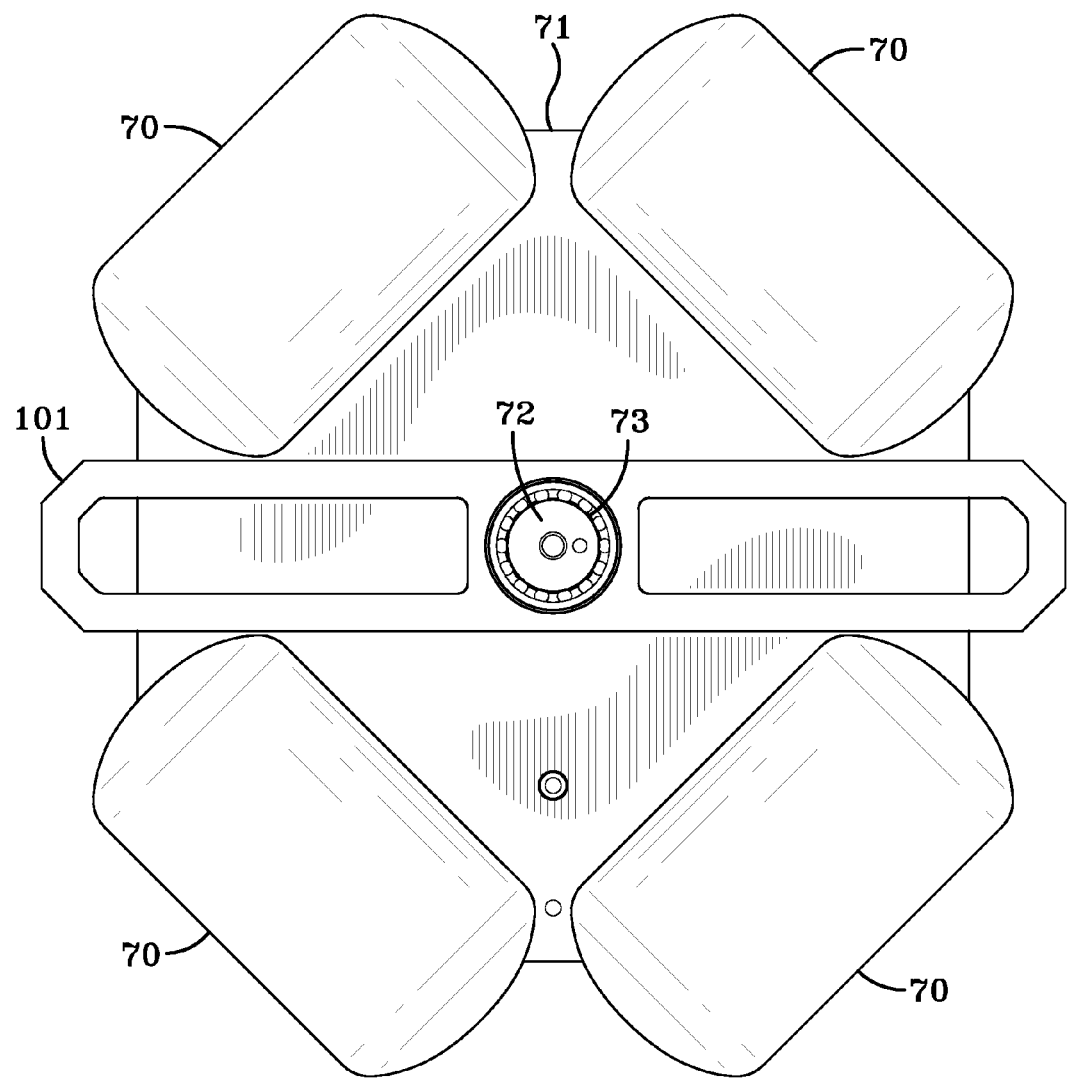
FIG. 5A is a top view of a portion of the device showing the gyros and the plate to which the gyros are attached.

FIG. 5A is a top view of a portion of the device as shown in Fig. looking down from a vantage point located below the center of the inverted U shaped hanger. Suspended below the crossbar 101 is a plate 71 to which a plurality of gyroscopic stabilizers (gyros) 70 are attached to stabilize the camera against pitch, roll and yaw. Preferably the gyros are attached to a top side of the plate as shown. Preferably each of the gyros 70 is constructed to resist rotation about two perpendicular axes. It is preferred that the longitudinal axes of the gyros intersect to present a diamond formation when viewed from above in the manner presented in FIG. 5A. However it is understood that any suitable number of gyros may be employed and disposed in any suitable configuration attached to any suitable component of the device without varying from the scope of the present invention. The gyros are connected to a power source by suitable electrical conductors, which are now shown for reasons of clarity of the drawings. If needed an inverter may be installed the platform 38 shown in FIG. 5.

Exemplary gyros that have been used in a prototype are KS-6 obtained from Kenyon Laboratories LLC, 12 Scovil Road, Higganum, Conn. 06441, http//www.ken-lab.com. However any suitable gyros may be employed in the practice of the invention.

The means for suspending the gyro mounting plate 71 below the crossbar 101 is best disclosed with reference to FIGS. 5A, 11A, 11B, 11C and 11D. The gyros and the camera mounting plate are both omitted from FIGS. 11A, 11*b*, 11*c* and 11D for clarity. In a first embodiment shown in FIGS. 5A, 11A and 11B a pivot rod 72 is fixed to the plate 71 upon which the gyros 70 are mounted. The pivot rod of this embodiment is threaded along a portion of its' length 74 and the plate 71 is secured between a pair of nuts 75, 75 allowing the location of the plate on the pivot rod to be adjusted to fine tune the balance of the assembly. The pivot rod 72 extends through an opening in the crossbar 101, said opening being located midway between the ends of the crossbar. This arrangement places the pivot rod directly below the handle 105. In this first arrangement a self-aligning ball bearing 73 is disposed with the opening in the crossbar 101. Self aligning bearings are well known and comprise two rows of balls and a common concave raceway in the outer ring. The bearing is consequently self aligning and insensitive to angular misalignments of the pivot rod 72 in a device of the present invention where deflections and misalignment are encountered due to vibrations and changes in attitude of the helicopter or other conveyance. A second embodiment is shown in FIGS. 11C and 11D wherein an end of the pivot rod 77 is fixed directly to the plate 71 upon which the gyros are mounted. The pivot rod 77 extends through an opening in the crossbar 101 and is secured to the crossbar by a pivot pin 78. As in the first embodiment the opening in the crossbar is located midway between the ends of the crossbar and the pivot rod is directly below the handle 105.

With reference to FIGS. 11A and 11B it can be seen that a device according to the present invention as shown in FIGS. 2 through 114D the yaw axis for aiming a camera mounted on a mounting plate fixed to the top of the pivot pin 78 is located above the camera as indicated by an arrow Y where the handle 105 can be rotated in FIG. 11A; the roll axis as indicated by an arc R in FIG. 11A where the pivot pin 72 pivots with respect to the crossbar 101 is located below the camera; and the pitch axis as indicated by an arc P in FIG. 11B where the crossbar 101 pivots with respect to the lower ends of the legs of the inverted U shaped hanger 100 is located below the camera.

Figure 5B:
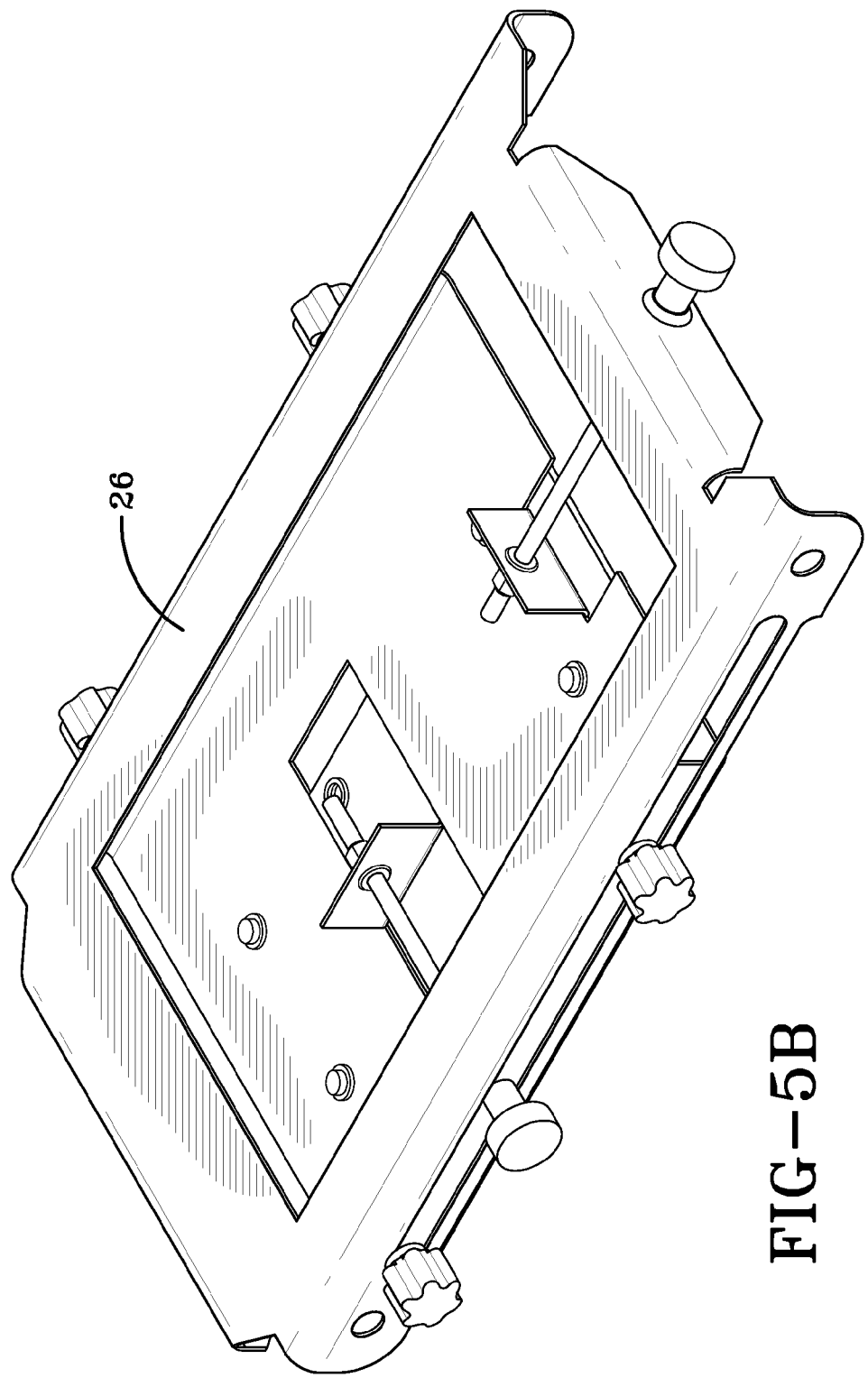
FIG. 5B is a perspective view of the camera mounting plate for attaching the camera to the device.

FIG. 5 is a perspective view of the device 10 for supporting a camera according to the invention wherein the camera and the mounting plate for attaching the camera to the device are not shown. The camera and camera mounting plate are not shown in FIGS. 11A, 11B, 11C and 11D. When a camera is to be fixed to the device it is preferable to use a camera mounting plate such as the exemplary mounting plate 26 shown in FIG. 5B. The exemplary mounting plate is for a series 4000 video system marketed by Glidecam Industries, Inc., 23 Joseph Street, Kingston, Mass. 0234, www.glidecam.com. Such a camera mounting plate has several features for adapting to a variety of cameras and securing a camera to the mounting plate. The camera mounting plate is fixed to the top of a pivotable hanger post 72 using a suitable means for attachment such as a threaded member that mates with a complementary threaded hole in the top of the pivotable hanger post.

Figure 13:
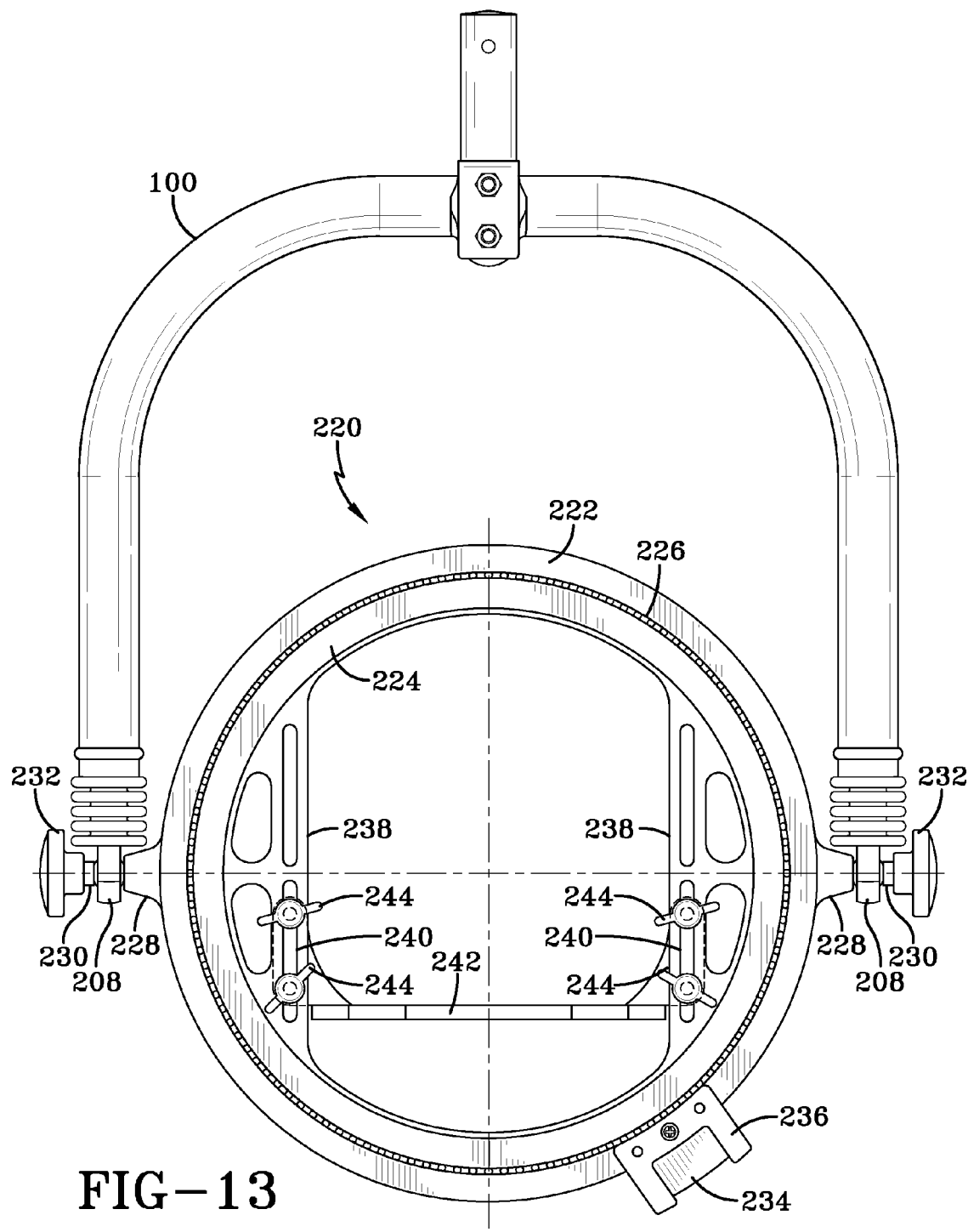
FIG. 13 shows an alternative means for mounting a camera to the hanger that is suspended from the upper portion of the device.

FIG. 13 shows an alternative means 220 for mounting a camera to the inverted U shaped hanger 100 that is suspended from the upper portion of the device for supporting a camera according to the invention as described above. The alternative means for mounting the camera has a 360 degree roll capability and was obtained from Copterworks, Inc., 820 Thompson Avenue, Unit #6, Glendale, Calif. 91201, U.S.A., http://www.copterworks.com. Copterworks, Inc. indicates on its webpage that the device is actually manufactured by VARIO Helicopter of Germany, whose proper name is VARIO Helicopter Uli Streich GmbH & Co. KG, Seewiesenstr. 7, D-97782 Gräfendorf, Germany, http://www.vario-helicopter.de. This alternative means is intended to be mounted at the nose of a remote control helicopter. The alternative means 220 for mounting a camera to the inverted U shaped hanger 100 has a pair of concentric rings 222, 224 that are joined by a geared interface 226. Diametrically opposed projections 228 extend from the outer ring 222 through passages in the lower support bracket members 208 at the ends of the legs of the inverted U shaped hanger. This arrangement allows the camera mounting device 220 to pivot around an axis. If desired the ends of the diametrically opposed projections 228 may be provided with knobs or gears 232 that may be driven by motors. At least one servo motor 234 fixed to the camera mounting device 220 via a mounting bracket 236 causes the inner ring 224 to rotate independently of the outer ring 222 to compensate for turbulence and vibrations. A suitable combination of servo motors and electronic gyros would eliminate the need for the more costly and heavier mass gyros used in the previously disclosed embodiment of the present invention. Webs 238 inside the inner ring 224 have a pair of opposed slots 240 that allow adjustment of the position of a camera mounting platform 242 upon which a camera (not shown) may be mounted. The position of the camera mounting platform is maintained by appropriate locking means 244 associated with the slots 240.

Figure 14:
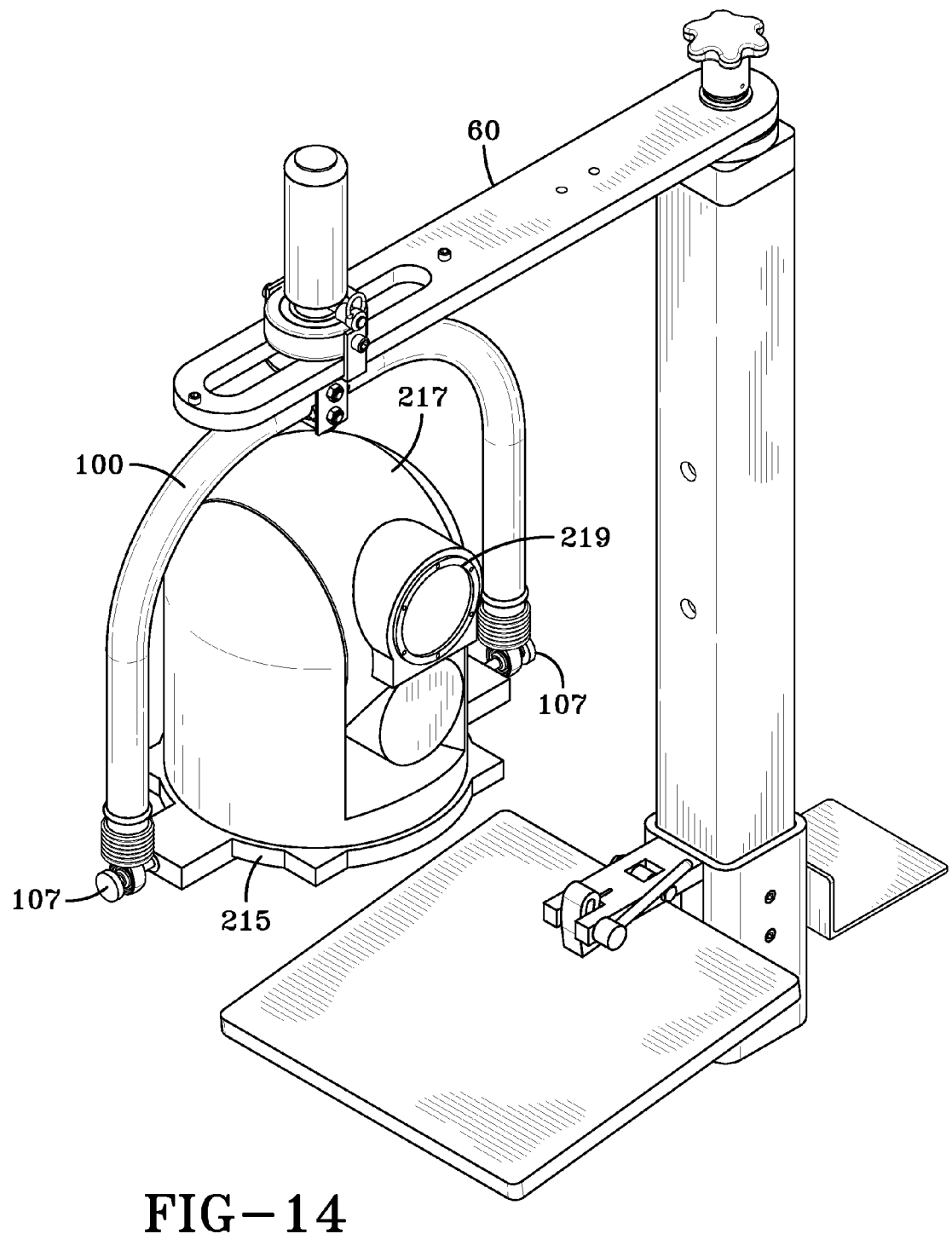
FIG. 14 shows another alternative means for mounting a camera to the hanger that is suspended from the upper portion of the device.

FIG. 14 shows another alternative means for mounting a camera to the hanger that is suspended from the upper portion of the device. The device for supporting a camera according to the invention is the same as described above except a camera pod 217 is suspended from the swing arm 60 via the inverted U shaped hanger 100. The camera pod 217 fixed to a platform 215 that is in turn fixed to the inverted U shaped hanger using a fastener 107. A camera lens 119 of the camera pod may be rotated by mechanisms located in the camera pod. It is understood that the camera pod shown in FIG. 14 is a generic representation. As taught in the prior art the camera pod includes means for reducing the vibrations and shocks transmitted to the camera, such means including for example gyros, springs, and other damping mechanisms. Specific examples of camera pods that could be used are taught for example in U.S. Pat. No. 5,184,521 and U.S. Pat. No. 5,897,223, each of which is incorporated herein in its entirety for the purpose of teaching camera pods that may be employed in the practice of the present invention.

Figure 15:
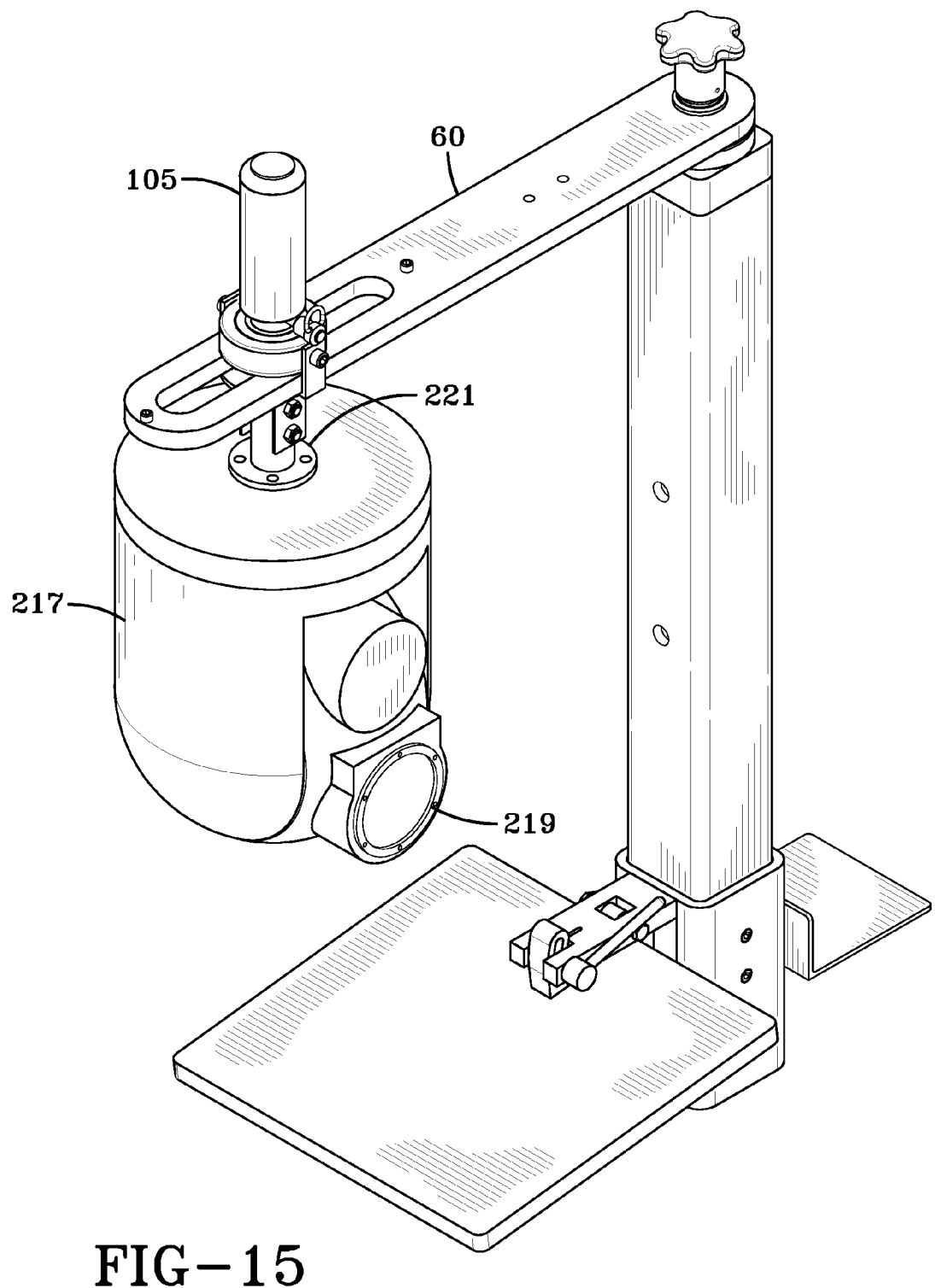
FIG. 15 shows yet another alternative means for suspending a camera from the upper portion of the device.

FIG. 15 shows yet another alternative means for suspending a camera from the upper portion of the device. The device for supporting a camera according to the invention is the same as described above except a camera pod 217 is suspended from the swing arm 60 via the handle 118 using a fixing mechanism 221. A camera lens 219 of the camera pod may be rotated by mechanisms located in the camera pod. It is understand that the camera pod shown in FIG. 14 is a generic representation. Specific examples of camera pods that could be used are taught for example in U.S. Pat. No. 5,184,521 and U.S. Pat. No. 5,897,223, each of which is incorporated herein in its entirety for the purpose of teaching camera pods that may be employed in the practice of the present invention.

While the invention has been described with reference to certain exemplary embodiments, obvious modifications and alterations are possible by those skilled in the related art. Therefore, it is intended that the invention include all such modifications and alterations to the full extent that they come within the scope of the following claims or the equivalents thereof.

What is claimed is:

1. A device for supporting a camera to facilitate capturing stable images from a moving and vibrating platform, the device comprising:
   (a) a base plate;
   (b) a single vertical post attached to the base plate and extending upwardly from the base plate, the base plate fixed to the vertical post inclined at an angle extending below horizontal with respect to the vertical post;
   (c) a swing arm fixed to the top of the vertical post in a manner that allows the swing arm to pivot around a vertical axis of the vertical post;
   (d) a handle fixed to the swing arm in a movable manner and extending upwardly from the swing arm, the handle being movable longitudinally with respect to the swing arm;
   (e) an inverted U shaped hanger that can be moved by the handle and is located below the swing arm for supporting the camera, the inverted U shaped hanger having a pair of legs, each leg having a hollow portion that is provided with a means for reducing transmission of shocks and vibrations to the camera;
   (f) a crossbar extending between and fixed to a lower end of each of the legs of the inverted U shaped hanger; and
   (g) a pivot rod that extends through an opening in the crossbar and is secured to the crossbar in a manner that allows the pivot rod to pivot with respect to the crossbar, a portion of the pivot rod located below the crossbar and a portion of the pivot rod is located above the crossbar and is attachable to the camera.

2. The device for supporting a camera to facilitate capturing stable images from a moving and vibrating platform according to claim 1 wherein the handle that extends upwardly from the swing arm is rotatable.

3. The device for supporting a camera to facilitate capturing stable images from a moving and vibrating platform according to claim 1 wherein the pivot rod is secured to the crossbar by a pivot pin.

4. The device for supporting a camera to facilitate capturing stable images from a moving and vibrating platform according to claim 1 wherein the pivot rod is secured to the crossbar by a self-aligning ball bearing that is disposed within the opening in the crossbar.

5. The device for supporting a camera to facilitate capturing stable images from a moving and vibrating platform according to claim 1 wherein the crossbar is fixed to the lower ends of the legs of the inverted U shaped hanger by fasteners that allow the crossbar to pivot with respect to the lower ends of the legs of the inverted U shaped hanger.

6. The device for supporting a camera to facilitate capturing stable images from a moving and vibrating platform according to claim 1 further comprising a camera fixed to the portion of the pivot rod located above the crossbar, and wherein a yaw axis for aiming a camera is located above the camera and a roll axis and a pitch axis are located below the camera.

7. The device for supporting a camera to facilitate capturing stable images from a moving and vibrating platform according to claim 1 wherein the inverted U shaped hanger is fixed to the handle in a manner that prevents the inverted U shaped hanger from pivoting with respect to the handle.

8. The device for supporting a camera to facilitate capturing stable images from a moving and vibrating platform according to claim 1 further comprising means for securing the device inside a helicopter without altering the structural integrity of the helicopter.

9. The device for supporting a camera to facilitate capturing stable images from a moving and vibrating platform according to claim 1 wherein the inverted U shaped hanger may be rotated about a longitudinal axis of the handle.

10. A device for supporting a camera to facilitate capturing stable images from a moving and vibrating platform, the device comprising:
   (a) a base plate;
   (b) a single vertical post attached to the base plate and extending upwardly from the base plate, wherein the base plate is fixed to the vertical post by a mechanism that is adjustable to vary the inclination of the base plate with respect to the vertical post;
   (c) a swing arm fixed to the to of the vertical post in a manner that allows the swing arm to pivot around a vertical axis of the vertical post;
   (d) a handle fixed to the swing arm in a movable manner and extending upwardly from the swing arm, the handle being movable longitudinally with respect to the swing arm;
   (e) an inverted U shaped hanger that can be moved by the handle and is located below the swing arm for supporting the camera, the inverted U shaped hanger having a pair of legs, each leg having a hollow portion that is provided with a means for reducing transmission of shocks and vibrations to the camera;
   (f) a crossbar extending between and fixed to a lower end of each of the legs of the inverted U shaped hanger; and
   (g) a pivot rod that extends through an opening in the crossbar and is secured to the crossbar in a manner that allows the pivot rod to pivot with respect to the crossbar, a portion of the pivot rod located below the crossbar and a portion of the pivot rod is located above the crossbar and is attachable to the camera.

11. The device for supporting a camera to facilitate capturing stable images from a moving and vibrating platform according to claim 10 wherein the inverted U shaped hanger may be rotated about a longitudinal axis of the handle.

12. The device for supporting a camera to facilitate capturing stable images from a moving and vibrating platform according to claim 10 further comprising means for securing the device inside a helicopter without altering the structural integrity of the helicopter.

13. The device for supporting a camera to facilitate capturing stable images from a moving and vibrating platform according to claim 10 wherein the pivot rod is secured to the crossbar by a pivot pin.

14. The device for supporting a camera to facilitate capturing stable images from a moving and vibrating platform according to claim 10 wherein the crossbar is fixed to the lower ends of the legs of the inverted U shaped hanger by fasteners that allow the crossbar to pivot with respect to the lower ends of the legs of the inverted U shaped hanger.

15. The device for supporting a camera to facilitate capturing stable images from a moving and vibrating platform according to claim 10 further comprising a camera fixed to the portion of the pivot rod located above the crossbar, and wherein a yaw axis for aiming a camera is located above the camera and a roll axis and a pitch axis are located below the camera.

16. A device mountable in a Robinson R44 helicopter for supporting a camera to facilitate capturing stable images, the Robinson R44 helicopter having two rear seats that are supported by a single seat base with a channel in the seat base disposed between the two rear seats, and a reinforcing bar that extends transversely across the helicopter between pillars located between front and rear doors of the helicopter behind a pair of front seats and is fixed to the pillars, the seat base and the reinforcing bar being a structural components of the helicopter, the device comprising:
   (a) a base plate;
   (b) a single vertical post attached to the base plate and extending upwardly from the base plate, the base plate being inclined with respect to the vertical post that allows the entire base plate to rest against a seat cushion of a rear seat of the helicopter when the single vertical post is oriented vertically;
   (c) a swing arm fixed to the top of the vertical post in a manner that allows the swing arm to pivot around a vertical axis of the vertical post;
   (d) a handle fixed to the swing arm in a movable manner and extending upwardly from the swing arm, the handle being movable longitudinally with respect to the swing arm;
   (e) an inverted U shaped hanger that can be moved by the handle and is located below the swing arm for supporting the camera, the inverted U shaped hanger having a pair of legs, each leg having a hollow portion that is provided with a means for reducing transmission of shocks and vibrations to the camera;
   (f) a crossbar extending between and fixed to a lower end of each of the legs of the inverted U shaped hanger, the crossbar being fixed to the lower ends of the legs of the inverted U shaped hanger by fasteners that allow the crossbar to pivot with respect to the lower ends of the legs of the inverted U shaped hanger;
   (g) a pivot rod that extends through an opening in the crossbar and is secured to the crossbar in a manner that allows the pivot rod to pivot with respect to the crossbar, a portion of the pivot rod located below the crossbar and a portion of the pivot rod is located above the crossbar and is attachable to the camera; and
   (g) a means for securing the device inside the helicopter by attaching the device to the seat base and the reinforcing bar without altering the structural integrity of the seat base and the reinforcing bar of the helicopter.

17. The device mountable in a Robinson R44 helicopter for supporting a camera to facilitate capturing stable images according to claim 16 wherein the device is attached to the reinforcing bar that extends transversely across the helicopter via a stabilizing bar is attached by a means for attachment to the vertical post, the stabilizing bar is further attached to the reinforcing bar that extends transversely across the helicopter by a means for attachment that does not require altering the shape or strength of the reinforcing bar.

18. The device mountable in a Robinson R44 helicopter for supporting a camera to facilitate capturing stable images according to claim 16 wherein the device is attached to the seat base via a telescoping anchor member receivable in the recessed portion of the seat base of the rear seats and is secured in place at a length pressed against the vertical sides of the recess by a locking means, and a strut extends between and is fixed to the telescoping anchor member and the vertical post or a sleeve that receives the vertical post and is also fixed to the base plate.

19. The device for supporting a camera to facilitate capturing stable images from a moving and vibrating platform according to claim 16 wherein the inverted U shaped hanger may be rotated about a longitudinal axis of the handle.

* * * * *